(12) United States Patent
Cerri

(10) Patent No.: US 11,721,100 B2
(45) Date of Patent: Aug. 8, 2023

(54) AUTOMATIC AIR RECIRCULATION SYSTEMS FOR VEHICLES

(71) Applicant: Ambarella International LP, Santa Clara, CA (US)

(72) Inventor: Pietro Cerri, Parma (IT)

(73) Assignee: Ambarella International LP

( * ) Notice: Subject to any disclaimer, the term of this patent is extended or adjusted under 35 U.S.C. 154(b) by 336 days.

(21) Appl. No.: 16/883,720

(22) Filed: May 26, 2020

(65) Prior Publication Data

US 2021/0374412 A1    Dec. 2, 2021

(51) Int. Cl.
| | |
|---|---|
| *G06V 20/40* | (2022.01) |
| *G06T 7/70* | (2017.01) |
| *B60H 1/00* | (2006.01) |
| *G06T 7/90* | (2017.01) |
| *G06V 20/58* | (2022.01) |

(52) U.S. Cl.
CPC ............ *G06V 20/41* (2022.01); *B60H 1/008* (2013.01); *B60H 1/00849* (2013.01); *G06T 7/70* (2017.01); *G06T 7/90* (2017.01); *G06V 20/46* (2022.01); *G06V 20/584* (2022.01); *G06T 2207/10016* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,971,578 B2* | 3/2015 | Sekiguchi | G06V 20/00 |
| | | | 382/104 |
| 10,145,340 B1* | 12/2018 | Dudar | F02D 41/0002 |
| 2016/0318368 A1* | 11/2016 | Alger | G08G 1/096725 |
| 2017/0113512 A1* | 4/2017 | Park | G06V 40/18 |
| 2020/0238786 A1* | 7/2020 | Murphy | B60H 1/00792 |
| 2021/0309073 A1* | 10/2021 | Goel | B60H 1/00849 |

* cited by examiner

*Primary Examiner* — James M Anderson, II
(74) *Attorney, Agent, or Firm* — Christopher P. Maiorana, PC

(57) ABSTRACT

An apparatus includes a capture device and a processor. The capture device may be configured to generate pixel data corresponding to an exterior view from a vehicle. The processor may be configured to generate video frames from the pixel data, perform computer vision operations on the video frames to detect objects in the video frames and determine characteristics of the objects, analyze the characteristics with respect to the vehicle to determine visual indicators to predict an air quality and generate a control signal in response to an air quality value. The control signal may be configured to toggle an activation of an air recirculation feature of the vehicle when the air quality value reaches a threshold value. The visual indicators may be used to adjust the air quality value.

19 Claims, 14 Drawing Sheets

952 START

954 PERFORM COMPUTER VISION OPERATIONS ON VIDEO FRAMES TO DETECT VISUAL INDICATORS

956 RECEIVE MAP DATA

958 DETERMINE LOCATION OF EGO VEHICLE WITH RESPECT TO MAP DATA

960 DETERMINE PATH OF EGO VEHICLE WITH RESPECT TO MAP DATA

962 ARE THERE INDICATORS OF REDUCED AIR QUALITY IN PATH OF EGO VEHICLE ON MAP DATA? — NO

YES

964 REDUCE AIR QUALITY VALUE

966 IS AIR QUALITY VALUE BELOW THRESHOLD? — NO

YES

968 ACTIVATE AIR RECIRCULATION SYSTEM

AUTOMATIC AIR RECIRCULATION SYSTEMS FOR VEHICLES

FIELD OF THE INVENTION

The invention relates to computer vision generally and, more particularly, to a method and/or apparatus for implementing automatic air recirculation systems for vehicles.

BACKGROUND

While electric vehicles have become viable options for drivers, the majority of vehicles on the road use an internal combustion engine. Vehicles with internal combustion engines create a significant amount of air pollution (i.e., carbon dioxide emissions) while driving. A person can see fumes being expelled from the exhaust pipes of vehicles on the road. These fumes are harmful to human health. While many countries, states and regions have some regulations that limit the amount of exhaust fumes that vehicles release while driving, the exhaust fumes can still easily be seen and inhaled while driving. Even with regulations, there are vehicles on the road that release thick black clouds of exhaust, especially when accelerating.

Despite the health issues that vehicle exhaust fumes can cause to humans, the nature of roads and vehicle travel result in people being exposed to exhaust fumes. A person in one vehicle will drive into the exhaust fumes of a vehicle in front. While driving within a city, vehicles on the road are packed close to each other, particularly at stop lights. Driving through roadway tunnels is particularly concerning since tunnels are relatively enclosed spaces with limited ventilation for exhaust fumes.

Some drivers avoid smelling exhaust fumes by activating air recirculation systems of a vehicle. However, there are drawbacks to using air recirculation all the time. In cold weather conditions, humid air will be trapped within the vehicle, which leads to window fog. Some drivers prefer to have fresh air brought in from outside the vehicle, instead of continually breathing recirculated air. Most drivers leave air recirculation off by default. If a driver is not quick enough to activate air recirculation when there is a lot of exhaust fumes (or other undesirable smell) around, the vehicle will have already let the exhaust fumes into the car.

It would be desirable to implement automatic air recirculation systems for vehicles.

SUMMARY

The invention concerns an apparatus comprising a capture device and a processor. The capture device may be configured to generate pixel data corresponding to an exterior view from a vehicle. The processor may be configured to generate video frames from the pixel data, perform computer vision operations on the video frames to detect objects in the video frames and determine characteristics of the objects, analyze the characteristics with respect to the vehicle to determine visual indicators to predict an air quality and generate a control signal in response to an air quality value. The control signal may be configured to toggle an activation of an air recirculation feature of the vehicle when the air quality value reaches a threshold value. The visual indicators may be used to adjust the air quality value.

BRIEF DESCRIPTION OF THE FIGURES

Embodiments of the invention will be apparent from the following detailed description and the appended claims and drawings.

FIG. 14 is a flow diagram illustrating a method for controlling an air recirculation system in response to analyzing map data.

DETAILED DESCRIPTION OF THE EMBODIMENTS

Figure 1:
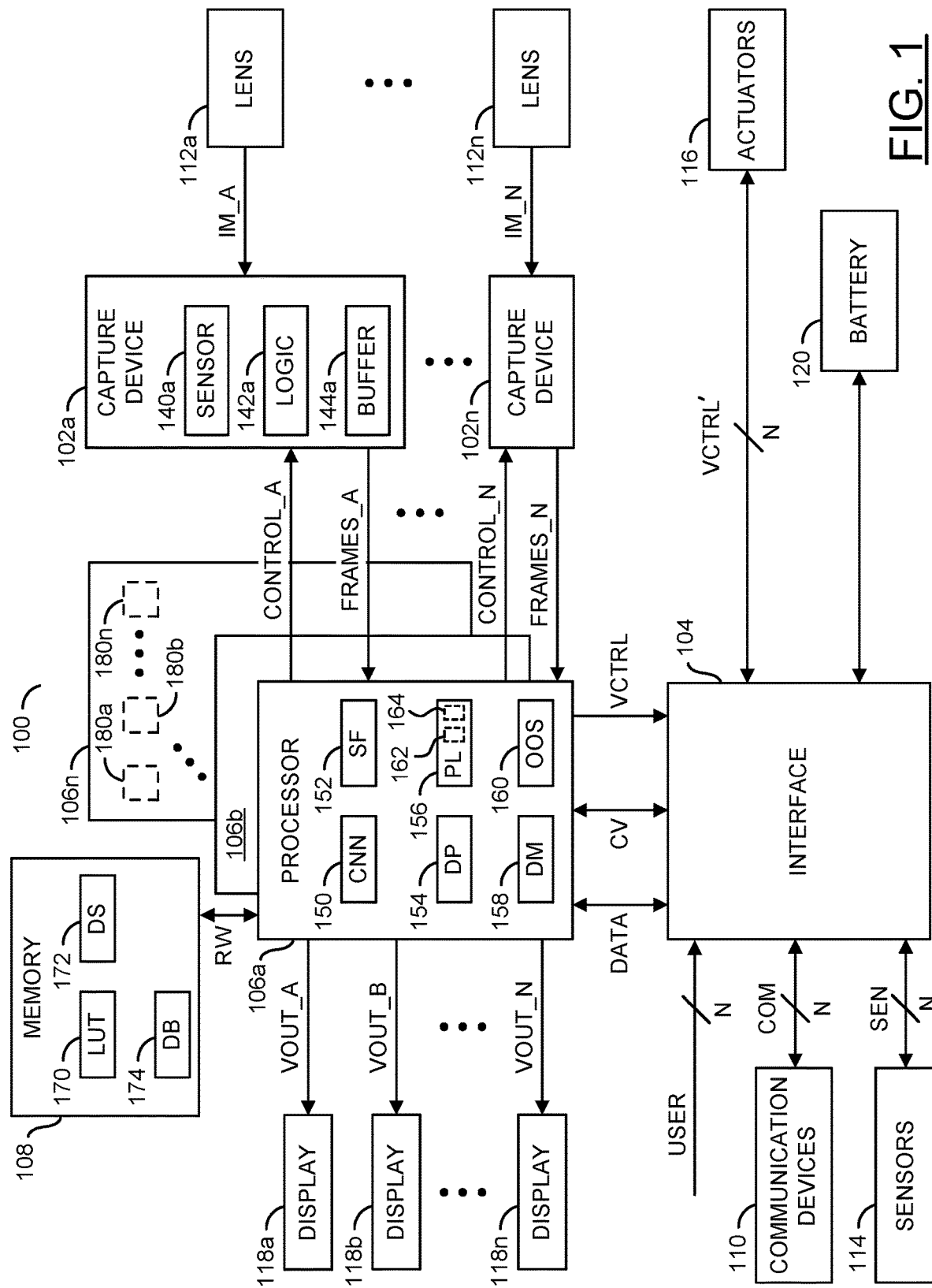
FIG. 1 is a diagram illustrating an embodiment of the present invention.

Embodiments of the present invention include providing automatic air recirculation systems for vehicles that may (i) implement computer vision, (ii) detect objects using a convolutional neural network, (iii) automatically activate an air recirculation system in response to objects detected in video frames, (iv) detect exhaust fumes, (v) detect scenarios with idling vehicles, (vi) determine an entry/exit from enclosed spaces, (vii) automatically enable/disable an air recirculation system in response to roadway and/or map data, (viii) estimate an air quality based on visual indicators of air quality and/or (ix) be implemented as one or more integrated circuits.

Embodiments of the present invention may be configured to detect situations in which air recirculation in a vehicle is desirable. In an example, air recirculation may be desirable when driving through a heavily polluted area, driving behind a vehicle that is emitting large amounts (or particularly dirty) exhaust fumes, driving in a poorly ventilated area, potential unpleasant smells are detected, etc. An air recirculation system of an ego vehicle may be activated or deactivated (e.g., toggled) automatically in response to detected scenarios and/or circumstances.

Embodiments of the present invention may be configured to perform computer vision operations to detect the scenarios for activating or deactivating the air recirculation system. Embodiments of the present invention may comprise video capture devices configured to generate video frames of an area near the ego vehicle. Embodiments of the present invention may supplement information determined from the results of the computer vision operations with information from map data. The map data may comprise information about roadways in relation to the location of the ego vehicle. The map data may indicate when the ego vehicle may be entering or exiting a poorly ventilated area. Embodiments of the present invention may be configured to activate the air recirculation system of the ego vehicle when a poorly ventilated area is entered and deactivate the air recirculation system of the ego vehicle when the poorly ventilated area is exited. In an example, the map data may indicate the location of tunnels and the air recirculation system may be activated while the ego vehicle is within a tunnel.

A combination of computer vision systems (e.g., computer vision based on object detection using a convolutional neural network and/or traditional object detection techniques such as masking) and map data may be used to detect tunnel entrances and exits, as well as exhaust smoke to activate/deactivate air recirculation. Other scenarios may be detected for activating/deactivating the air recirculation of the ego vehicle. In one example, the air recirculation may be activated in a scenario such as a vehicle queue (e.g., close vehicle (or vehicles) in front and the speed of the ego vehicle is slow such as a drive-through or a traffic jam). In another example, air recirculation may be activated in a scenario such as a close distance to a vehicle in front that may be detected using computer vision object detection and analysis. Information such as the speed of the ego vehicle may be determined using visual odometry (e.g., performing measurements by analyzing a sequence of video frames to determine speed) and/or reading vehicle odometry (e.g., reading information from a vehicle CAN bus). In yet another example, air recirculation may be activated in a scenario such as detecting a potential unpleasant smell (e.g., detecting a skunk, detecting a truck carrying farm animals, etc.).

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n.

The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
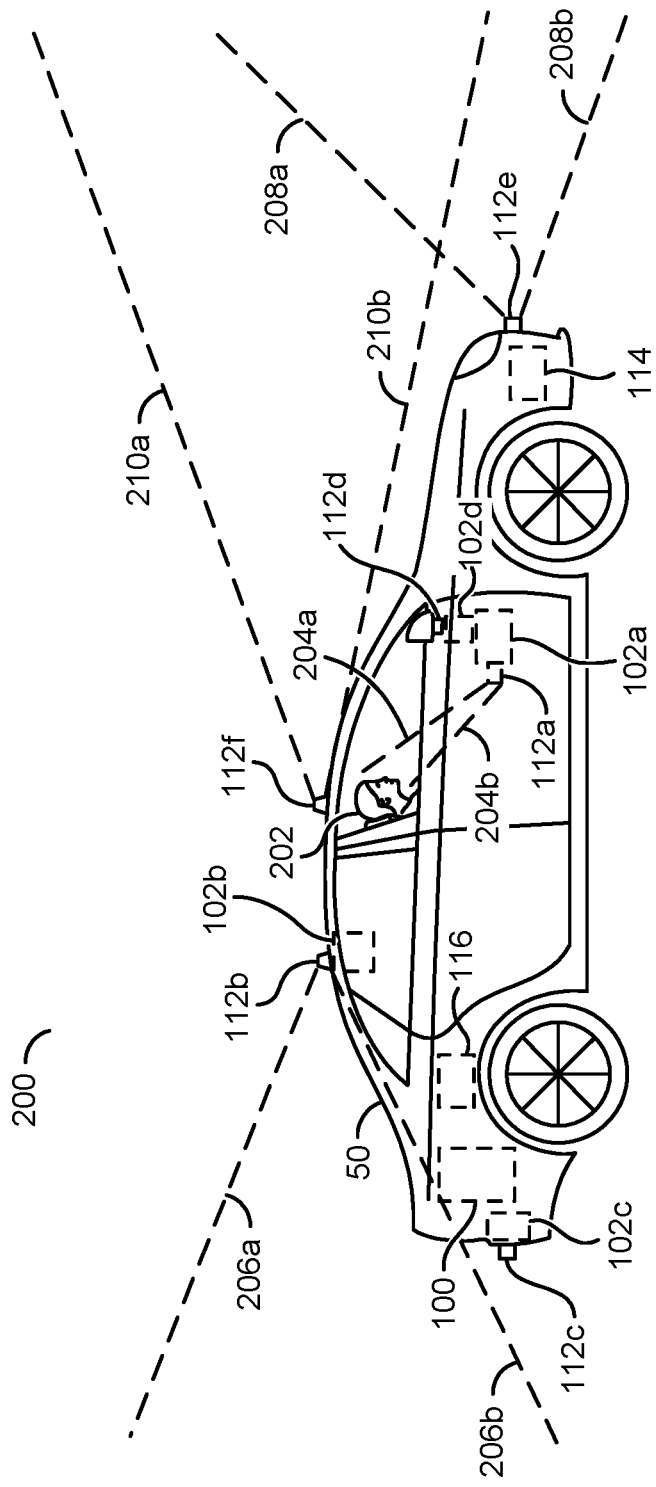
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112๐) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., an RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
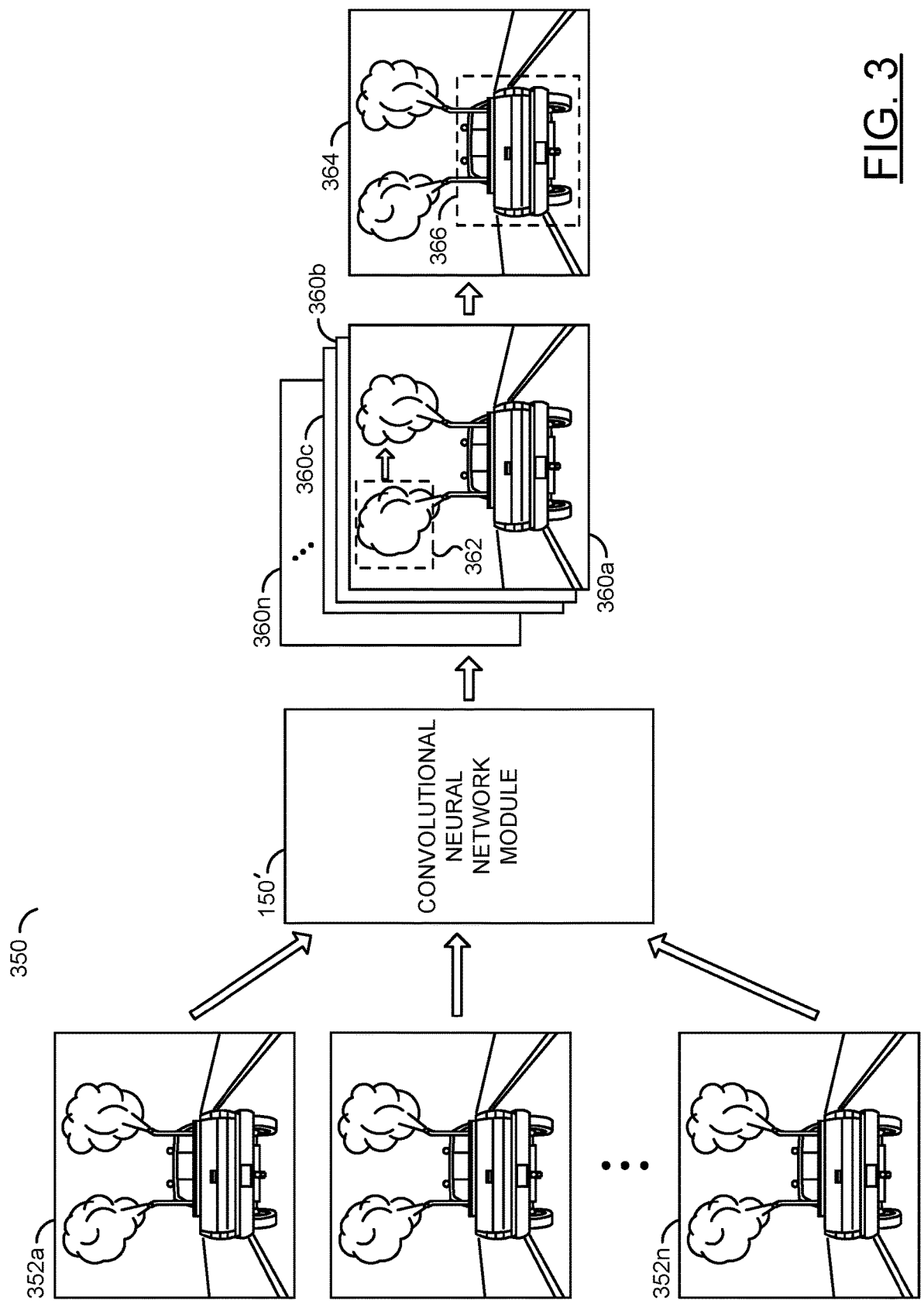
FIG. 3 is a diagram illustrating an example visualization of training a convolutional neural network for object detection using fleet learning.

Referring to FIG. 3, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the ego vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture video data of a speed bump (e.g., captured from a front camera of the ego vehicle 50). For example, the training data 352a-352n may be a sequence of video frames captured prior to the processors 106a-106n determining that a change in orientation of the vehicle has occurred (e.g., caused by a speed bump, a pothole, etc.). The training data 352a-352n may be labeled based on whether the prediction was incorrect or correct. Using the training data 352a-352n (e.g., video frames captured from many different vehicles as the vehicles are produced), many training data sets may be available to train the CNN module 150'. In an example, different makes and models of vehicles may be analyzed. In another example, different interior colors may be analyzed. In yet another example, different drivers (e.g., different people) may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features, vehicles, pedestrians, etc.) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may receive and analyze input images (e.g., the training data 352a-352n) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 364. The reference video frame 364 may comprise masks and/or categorized instances of the reference objects 366. The reference objects 3366 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100 in a fleet of vehicles. The CNN module 150' may continue to receive the training data 352a-352n from each apparatus 100, refine the machine learning model, and then provide updates to the machine learning model for each apparatus 100. The centralized CNN module 150' may develop, refine and/or enhance the machine learning model by receiving input (e.g., the training data 352a-352n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106a-106n), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352a-352n would be kept local. Whether the machine learning is performed locally (e.g., at the edge), performed using a centralized resource and/or performed using a combination of local and centralized resources may be varied according to the design criteria of a particular implementation.

Figure 4:
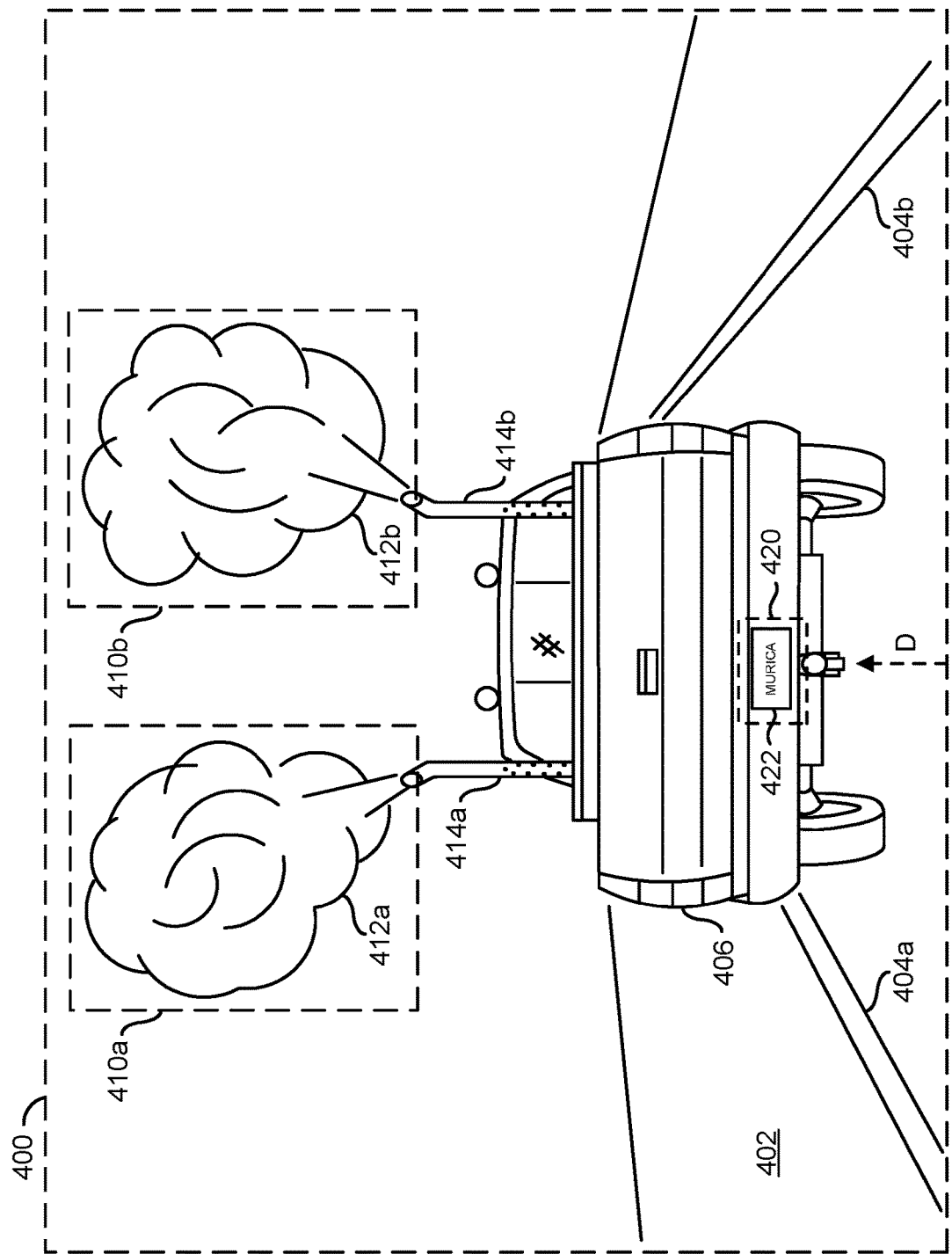
FIG. 4 is a diagram illustrating computer vision detection of exhaust fumes in an example video frame.

Referring to FIG. 4, a diagram illustrating computer vision detection of exhaust fumes in an example video frame is shown. An example video frame 400 is shown. The example video frame 400 may be generated by the processors 106a-106n in response to the pixel data generated by the capture devices 102a-102n. The capture devices 102a-102n may generate pixel data (e.g., the signals FRAMES_A-FRAMES_N) and the pixel data may be provided to the processors 106a-106n. The video processing pipeline 156 of the processors 106a-106n may be configured to generate video frames from the pixel data. The video frame 400 may be one example video frame of a sequence of video frames generated by the processors 106a-106n. The computer vision pipeline portion 162 and/or the CNN module 150 may be configured to perform computer vision operations on the video frames generated by the processor 106a-106n. The computer vision operations may enable the processor 106a-106n to detect objects in the video frames.

The example video frame 400 may comprise a roadway 402. In the example shown, the example video frame 400 may be a video frame generated in response to pixel data captured by the front lens 112e (e.g., the field of view 208a-208b) and/or the front lens 112f (e.g., the field of view 210a-210b) shown in association with FIG. 2. The apparatus 100 may be configured to capture and/or analyze video data of all locations around the ego vehicle 50 simultaneously. Generally, for detecting smog and/or pollutants (e.g., carbon dioxide) that the ego vehicle 50 will be driving towards, video frames corresponding to locations to the front of the ego vehicle 50 may provide the most relevant information. For example, when the ego vehicle 50 is traveling forward, the cabin of the ego vehicle 50 will eventually drive to locations that are currently in front of the ego vehicle 50. The air that is currently in front of the ego vehicle 50 may be the air that the driver 202 will eventually be breathing. The apparatus 100 may make a determination about whether to activate the air recirculation system in response to an estimated quality of the air around the ego vehicle 50. The air quality may be estimated based on visual indicators detected in the example video frame 400.

The roadway 402 may be the road that the ego vehicle 50 is traveling on. The roadway 402 may indicate which direction the ego vehicle 50 is driving. The roadway 402 may comprise lane markings 404a-404b. The lane markings 404a-404b may further provide a guide that may be used by the apparatus 100 to determine which direction the ego vehicle 50 will be traveling.

A vehicle 406 is shown in the video frame 400. In the example shown, the vehicle 406 may be a truck. The truck 406 may be located in front of the ego vehicle 50. For example, the ego vehicle 50 may be following the truck 406 on the roadway 402.

Dotted boxes 410a-410b are shown on the example video frame 400. The dotted boxes 410a-410b may represent results of the computer vision operations performed by the processors 106a-106n. For example, the dotted boxes 410a-410b may not be visible (e.g., not visible by the driver 202 when looking out the windshield at the truck 406 while driving). In some embodiments, the processors 106a-106n may generate the dotted boxes 410a-410b on the output video frames (e.g., when displayed on the displays 118a-118n) to indicate which objects have been detected (e.g., a visual indication when operating in a debug mode to enable a person to see what the processors 106a-106n are detecting).

The dotted boxes 410a-410b may correspond to smog clouds 412a-412b. The smog clouds 412a-412b may be located above the truck 406. The smog clouds 412a-412b may be pollutants emitted from exhaust pipes 414a-414b of the truck 406. The smog clouds 412a-412b may be the objects detected by the computer vision operations performed by the computer vision operations. The smog clouds 412a-412b may be examples of visual indicators used to predict and/or estimate an air quality near the ego vehicle 50. In an example, the smog clouds 412a-412b may comprise carbon dioxide. The analysis of the detected objects 410a-410b may determine that the smog clouds 412a-412b may cause an undesirable air quality.

A dotted box 420 is shown around a license plate 422 of the truck 406. Similar to the dotted boxes 410a-410b, the dotted box 420 may represent the results of the computer vision operations performed by the processors 106a-106n.

Detecting the license plate 422 may be an example of the characteristics of the truck 406 detected by the processors 106a-106n. For example, the processors 106a-106n may be configured to perform OCR operations on the license plate 422 to associate a license plate number with the truck 406. Other characteristics of the truck 406 may comprise a shape, size, make, model, color and/or other identifiable features (e.g., rust spots, scratches, bumper stickers, etc.). In some embodiments, the processors 106a-106n may use the characteristics detected to distinguish the truck 406 from other vehicles on the roadway 402 (e.g., identify the truck 406 as a particular truck).

The dotted boxes 410a-410b and/or the dotted box 420 may be representative examples of the objects detected by the processors 106a-106n. The processors 106a-106n may be configured to detect multiple objects simultaneously in the example video frame 400. For example, the processors 106a-106n may further detect the truck 406 as an object, the roadway 402 as an object and/or any other items as an object. Not all of the objects detected by the processors 106a-106n may be visual indicators of air quality. The types of objects detected by the processors 106a-106n may be varied according to the design criteria of a particular implementation.

An arrow D is shown at the bottom of the video frame 400. The arrow D may represent measurements, calculations and/or comparisons performed by the processors 106a-106n based on the detected objects in the video frame 400. Similar to the dotted boxes 410a-410b and/or the dotted box 420, the arrow D may be a visual representation that may not be on the actual output of the video frame 400 to the displays 118a-118n. The arrow D may be a measurement of the distance of the ego vehicle 50 to the truck 406.

The processors 106a-106n may be configured to detect the smog 412a-412b. The processors 106a-106n may analyze the smog 412a-412b in order to estimate an air quality near the ego vehicle 50. Various characteristics of the smog 412a-412b may be visual indicators used to predict the air quality. In one example, the size of the smog clouds 412a-412b may indicate a poor air quality. In another example, the color of the smog clouds 412a-412b may indicate a poor air quality (e.g., a black cloud of smoke). In yet another example, the density of the smog clouds 412a-412b may indicate a poor air quality (e.g., thicker clouds of smoke may be indicative of worse air quality). The characteristics of the smog clouds 412a-412b analyzed and/or the decisions made (e.g., how much weight to apply to each characteristics) in response to the characteristics detected may be varied according to the design criteria of a particular implementation.

The distance D from detected objects may be further considered by the processors 106a-106n to estimate the air quality near the ego vehicle 50. Pollutants and/or foul smelling odors may dissipate over time. The distance D may be an example of a visual indicator that may predict air quality. Generally, the farther away that detected objects are from the ego vehicle 50, the less likely that potential pollutants and/or foul smells will affect the air quality. For example, the smog clouds 412a-412b may cause a significant decrease in air quality if the ego vehicle 50 is close to the truck 406. However, if the ego vehicle 50 is far away from the truck 406, the smog clouds 412a-412b may have little affect on the ego vehicle 50.

The speed of the ego vehicle 50 may be considered when estimating an air quality near the ego vehicle 50. The processors 106a-106n may read from the sensors 114 to determine the current speed and/or acceleration of the ego vehicle 50. The speed of the ego vehicle 50 may determine an amount of time before the ego vehicle 50 reaches the smog clouds 412a-412b. For example, if the ego vehicle 50 is driving fast, there may be less time for the smog clouds 412a-412b to dissipate, which may result in a lower air quality compared to the amount of time if the ego vehicle 50 is driving slow.

Generally, the air quality near the ego vehicle 50 may be an estimated value. For example, from a visual analysis alone, determining an air quality may be inexact. The processors 106a-106n may compile visual indicators extracted from the detected objects that may provide evidence to support a likelihood of a particular type of air quality. The decision module 158 may apply statistical weighting to the various factors (e.g., visual indicators) detected using the computer vision operations. The statistical weighting may be used to determine an air quality value.

The air quality value may be a threshold value for activating the and/or deactivating (e.g., toggling) the air recirculation system of the ego vehicle 50. In one example, the threshold value may be a pre-determined value (e.g., programmed into the driving policy module 154). In another example, the threshold value may be a user customizable setting. For example, the apparatus 100 may be configured to receive input to enable the user (e.g., the driver 202) to input a preferred value for the air quality value. The configuration of the air quality value may be varied according to the design criteria of a particular implementation.

The apparatus 100 may be configured to toggle (e.g., activate and/or deactivate) an air recirculation feature of the ego vehicle 50 in response to determining that the estimated air quality is below/above the threshold value for the air quality value. The air recirculation system may be one of the actuators 116. The apparatus 100 may control the actuators 116 by generating the control signal VCTRL. For example, the processors 106a-106n may generate the control signal VCTRL in response to detecting that the air quality value is below a pre-determined value. In some embodiments, the processors 106a-106n may activate the air recirculation system 116 based on a particular object being detected. For example, the processors 116 may analyze the smog clouds 412a-412b and determine that the visual indicators of the smog clouds 412a-412b may indicate a decrease in air quality sufficient to activate the air recirculation system 116. The processors 106a-106n may further read the license plate 422 (and other characteristics of the truck 406), to identify the truck 406. The processors 106a-106n may associate the truck 406 with the decreased air quality caused by the smog clouds 412a-412b. The truck 406 may become a visual indicator for poor air quality. If the processors 106a-106n continue to detect the truck 406, the processors 106a-106n may automatically activate the air recirculation system 116. For example, the driver 202 may decide to pass the truck 406 because the driver 202 does not want to be behind a vehicle that is releasing so much exhaust. If the truck 406 later passes the ego vehicle 50, the processors 106a-106n may detect the truck 406 based on the previously detected characteristics and reactivate the air recirculation system 116 even without analyzing the smog clouds 412a-412b again.

The air recirculation system 116 may be configured to provide air filtration for the ego vehicle 50. The air filtration may prevent pollution, smog (e.g., carbon dioxide), air particulate matter and/or foul smells from entering the cabin of the ego vehicle 50. The air filtration may prevent poor quality air from outside the ego vehicle 50 from being breathed by the driver 202. For example, the air recirculation system 116 may be configured to limit an amount of air external to the ego vehicle 50 from entering the ego vehicle 50. The air recirculation system 116 may be configured to re-use air inside the ego vehicle 50 instead of using air intake from outside of the ego vehicle 50. Even with the air recirculation system 116 active the air outside of the ego vehicle 50 may still leak into the cabin of the ego vehicle 50. Activating the air recirculation system 116 may not prevent all foul smelling and/or poor quality air from entering the ego vehicle 50. However, the air recirculation system 116 may limit the amount of foul smelling and/or poor quality air from entering the ego vehicle 50 (e.g., the exhaust smell may be fainter when the air recirculation system 116 is active compared to when the air recirculation system 116 is inactive).

Figure 5:
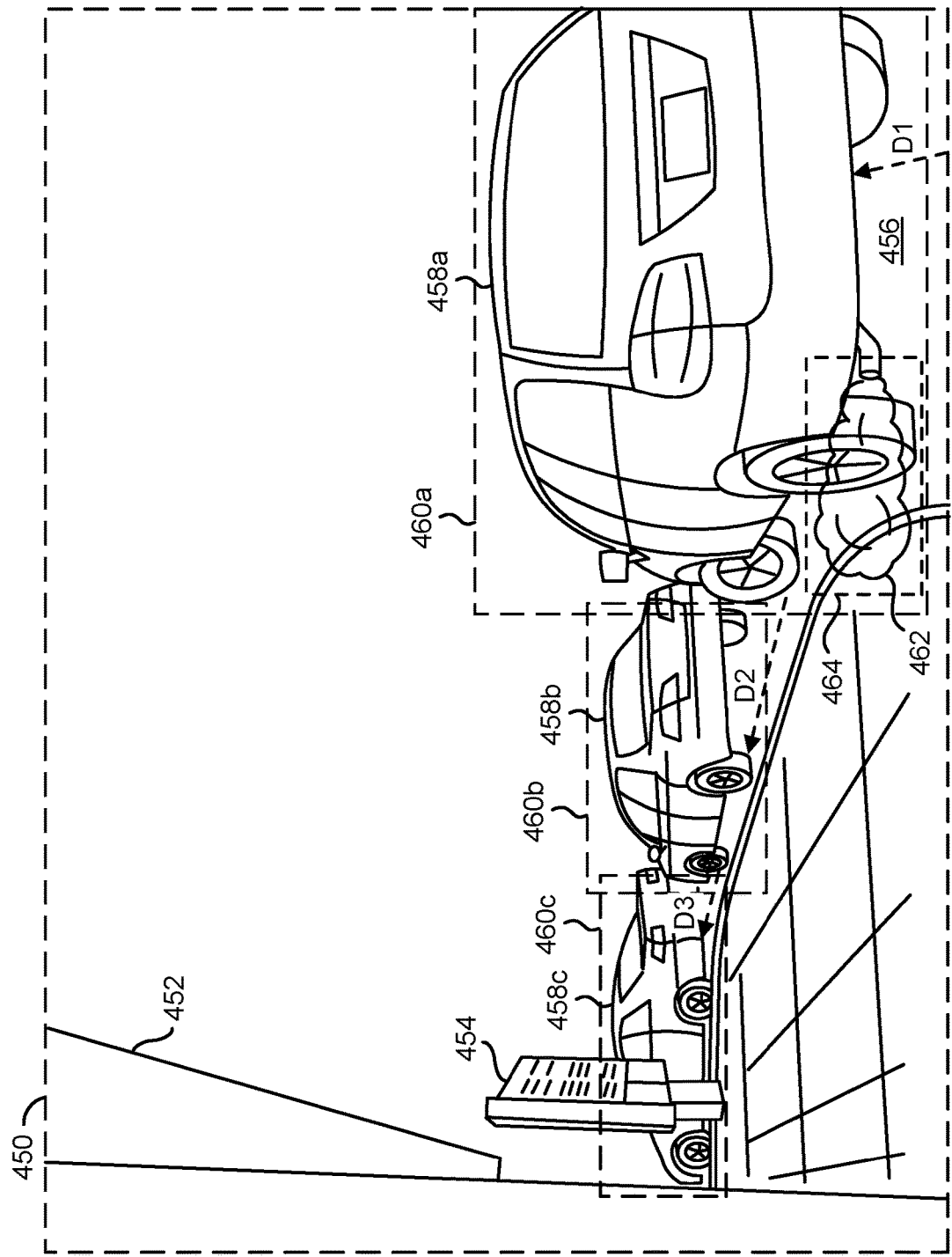
FIG. 5 is a diagram illustrating computer vision detection of an idling vehicle in an example video frame.

Referring to FIG. 5, a diagram illustrating computer vision detection of an idling vehicle in an example video frame is shown. An example video frame 450 is shown. The example video frame 450 may be generated similar to the video frame 400 shown in association with FIG. 4. The example video frame 450 may be one example video frame from a sequence of video frames analyzed by the CNN module 150.

The example video frame 450 may comprise a building 452, a menu board 454 and/or a roadway 456. Vehicles 458a-458c are shown on the roadway 456. The roadway 456 may run alongside the building 452 and lead the vehicles 458a-458c to the menu board 454. The example video frame 450 may be an example view of a drive through (e.g., a fast-food restaurant drive-thru). The vehicles 458a-458 may be waiting in a queue to drive up to the menu board 454 to place an order and then pick up the order. The ego vehicle 50 may be located behind the vehicle 458a. For example, of the vehicles 458a-458c shown in queue on the roadway 456, the ego vehicle 50 may be fourth in line (e.g., with potentially more vehicles ahead of the vehicle 458c hidden from view as the roadway 456 curves behind the building 452).

In a vehicle queue scenario as shown in the example video frame 450, the vehicles 458a-458c and the ego vehicle 50 may be generally idling and/or moving only from time to time. For example, the vehicles 458a-458c may be stationary over a sequence of video frames that comprise the example video frame 450. The apparatus 100 may be configured to detect a vehicle queue scenario by performing the computer vision operations. A vehicle queue may be an example of a visual indicator that corresponds to poor air quality. The processors 106a-106n may generate the signal VCTRL to activate the air recirculation system 116 in response to detecting a vehicle queue scenario.

While a drive through scenario is shown in the example video frame 450, other types of vehicle queues may be detected by the processors 106a-106n. In one example, the vehicle queue detected by the processors 106a-106n may be a traffic jam. In another example, the vehicle queue detected by the processors 106a-106n may be an intersection (e.g., a busy intersection with stop lights may cause traffic to temporary back up). In yet another example, the vehicle queue detected by the processors 106a-106n may be a traffic stop (e.g., an accident may result in a lane closure with police directing traffic, a RIDE program checking for drunk driving, etc.). In still another example, the vehicle queue detected by the processors 106a-106n may be a border crossing and/or toll road booth. The types of vehicle queues detected by the processors 106a-106n may be varied according to the design criteria of a particular implementation.

Dotted boxes 460a-460c are shown around the respective vehicles 458a-458c. The dotted boxes 460a-460c may represent the computer vision operations performed by the CNN module 150 and/or the computer vision pipeline portion 162 detecting objects. The computer vision operations are shown detecting the vehicles 458a-458c as the objects 460a-460c. While the vehicles 458a-458c are shown as being detected by the processors 106a-106n, other objects (e.g., the building 452, the menu board 454, the roadway 456, characteristics of the vehicles 458a-458c, etc.) may be simultaneously detected by the processors 106a-106n. Detecting multiple objects, classifying multiple types of objects and/or determining the characteristics of detected objects may enable the processors 106a-106n to understand the context of the scenario shown in the example video frame 450. The processors 106a-106n may perform the computer vision operations over the sequence of video frames to further understand the temporal context of the scenario shown in the example video frame 450.

Arrows D1-D3 are shown on the video frame 450. The arrows D1-D3 may represent measurements performed as part of the computer vision operations performed by the processors 106a-106n. The measurements performed by the processors 106a-106n may enable the processors 106a-106n to determine a distance of the detected objects 460a-460c from the ego vehicle 50 and/or the distances between the detected objects 460a-460c. In the example shown, the distance D1 may be the distance of the front end of the ego vehicle 50 to the rear end of the vehicle 458a. The distance D2 may be the distance of the front end of the vehicle 458a to the rear end of the vehicle 458b. The distance D3 may be the distance of the front end of the vehicle 458b to the rear end of the vehicle 458c.

In the example shown, the processors 106a-106n may determine that the distances D1-D3 may be relatively small distances for vehicles. In an example, the processors 106a-106n may compare the distances D1-D3 to a general traveling distance for vehicles (e.g., drivers often keep a two-vehicle length distance when driving, deep a two second distance, keep a 30 ft to 40 ft distance, etc.). The distances D1-D3 may be smaller than a two vehicle distance. In the example shown, the distances D1-D3 may be indicative of a 'bumper-to-bumper' scenario. The decision module 158 may determine that since the vehicles 458a-458c and the ego vehicle 50 are close together, the scenario shown in the video frame 450 may be a vehicle queue scenario. For example, small distances between vehicles may be a visual indicator of poor air quality.

The processors 106a-106n may perform the computer vision operations over the sequence of video frames that may comprise the video frame 450. A temporal analysis of a sequence of video frames by the processors 106a-106n may determine a movement of the vehicles 458a-458c. By performing the object detection, identifying the vehicles 458a-458c as specific vehicles, and monitoring the movement of specific objects over time may enable the processors 106a-106n to determine a speed and/or acceleration of the detected objects 460a-460c. In an example, the processors 106a-106n may detect the vehicle 458c in the example video frame 450. In subsequent video frames, the processors 106a-106n may detect the vehicle 458c (e.g., identified as a specific vehicle based on a generally consistent location in the video frames, a particular color, a make/model of vehicle, other identifying features, etc.) moving closer to the left edge of the video frames, and then even disappearing from the video frames (e.g., moving outside of the field of view 208a-208b). The change of position in the video frame of the detected objects 460a-460c from frame-to-frame may enable the processors 106a-106n to determine a speed and/or acceleration of the detected objects 460a-460c. The speed and/or acceleration of the detected objects 460a-460c may be visual indicators that may be used to predict air quality.

The processors 106a-106c may be configured to determine how fast and/or how often the detected objects 460a-460c are moving. The processors 106a-106n may read the signal SEN from the sensors 114 to determine how fast and/or how often the ego vehicle 50 is moving. The processors 106a-106n may further perform the computer vision operations to determine how fast and/or how often the ego vehicle 50 is moving (e.g., as the ego vehicle 50 moves along the roadway 456, a fixed object such as the menu board 454 may appear larger as the distance decreases). For example, the speed of the ego vehicle 50 may be used as a visual indicator for determining the air quality estimate.

The decision module 158 may analyze the results of the computer vision operations. The decision module 158 may be configured to determine whether the ego vehicle 50 is in a vehicle queue scenario. The decision module 158 may generate a confidence value based on the results of the computer vision operations. If the confidence value is above some threshold value (e.g., 90% confidence), then the processors 106a-106n may generate the signal VCTRL to activate the air recirculation system 116. Various factors determined may increase or decrease the confidence level of a particular scenario. The change in confidence level for particular factors that may be associated with a vehicle queue and/or another type of scenario may be varied according to the design criteria of a particular implementation.

In one example, the decision module 158 may detect the relatively short distances D1-D3 between the ego vehicle 50 and the detected objects 460a-460c. For example, the short distances D1-D3 may indicate that vehicles 458a-458c are not driving or may be idling. The short distances D1-D3 may increase a confidence level that the ego vehicle 50 is in a vehicle queue scenario. In another example, the decision module 158 may detect that the detected objects 460a-460c are not moving over a sequence of video frames. Stationary vehicles may increase a confidence level that the ego vehicle 50 is in a vehicle queue scenario. Vehicle movement may decrease a confidence level that the ego vehicle 50 is in a vehicle queue scenario. In yet another example, the decision module 158 may detect movement at intervals. For example, in a drive through as food is delivered to one vehicle, the vehicle will leave the drive through and the rest of the cars in the drive through may advance forward and then stop again until the next food order is ready. Detecting movement of vehicles at intervals (e.g., regularly spaced intervals or irregularly spaced intervals) may increase a confidence level that the ego vehicle 50 is in a vehicle queue scenario. For example, detecting movement at intervals may be a visual indicator used to estimate the air quality near the ego vehicle 50.

The processors 106a-106n may be configured to generate the signal VCTRL to activate the air recirculation system 116 of the ego vehicle 50. A smoke cloud 462 is shown being emitted by the vehicle 458a in front of the ego vehicle 50. A dotted box 464 representing the computer vision operations detecting the smoke cloud 462 is shown. The smoke cloud 462 is shown generally transparent and small (e.g., compared to the smog clouds 412a-412b shown in association with FIG. 4). Generally, while vehicles are idling, the amount of exhaust fumes emitted may be smaller or not as thick. In some scenarios, the smoke cloud 462 may not be visible (e.g., not detectable using the computer vision operations). However, exhaust from idling is known to contribute a significant amount of pollution. Furthermore, the close proximity of the ego vehicle 50 to the vehicle 458a may cause more of the smoke cloud 462 to be inhaled by the driver 202. The processors 106a-106n may activate the air recirculation system 116 in response to detecting the vehicle queue even if the smoke cloud 462 is not visible.

Figure 6:
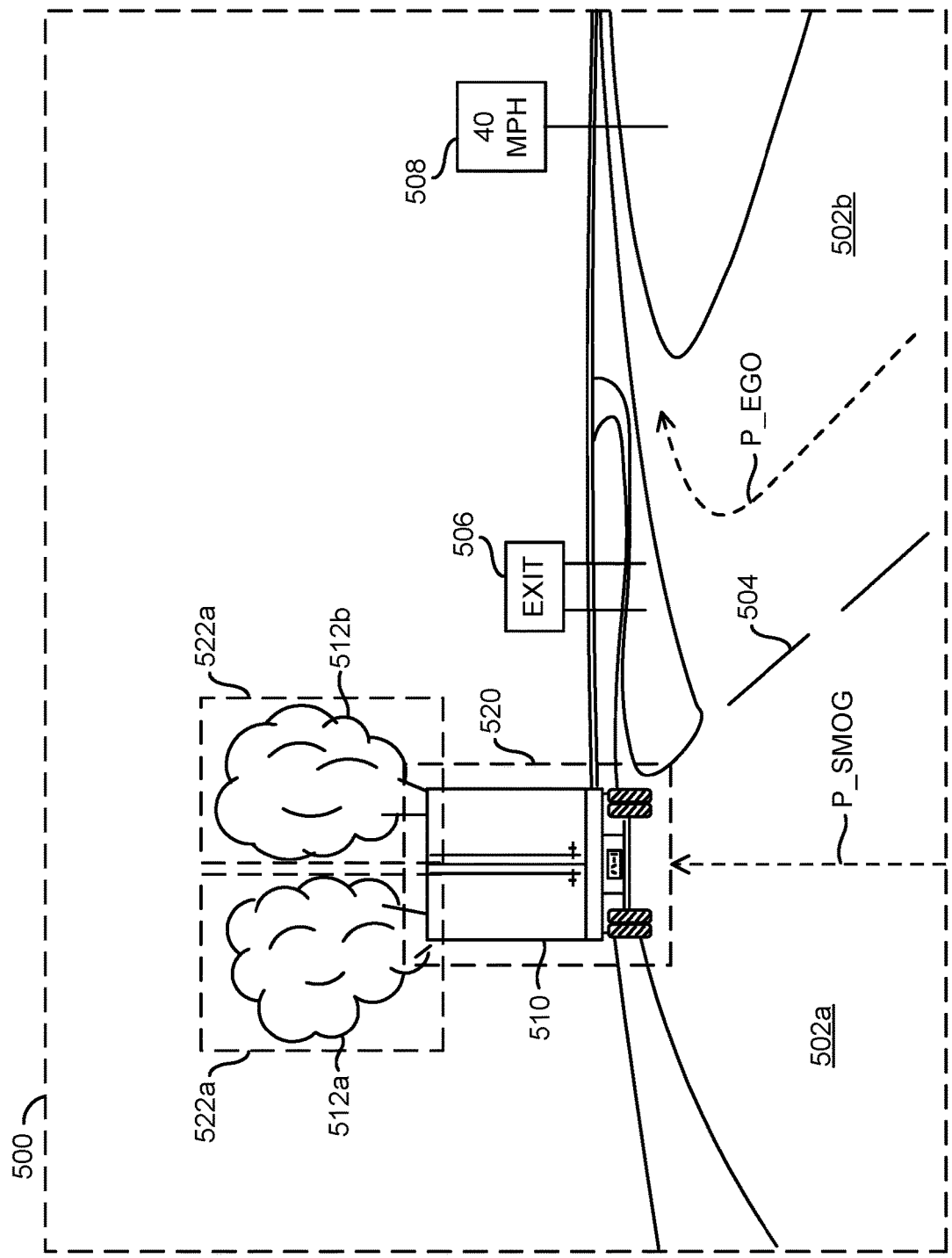
FIG. 6 is a diagram illustrating using computer vision to determine a path of a polluting vehicle compared to the ego vehicle in an example video frame.

Referring to FIG. 6, a diagram illustrating using computer vision to determine a path of a polluting vehicle compared to the ego vehicle in an example video frame is shown. An example video frame 500 is shown. The example video frame 500 may be generated similar to the video frame 400 shown in association with FIG. 4. The example video frame 500 may be one example video frame from a sequence of video frames analyzed by the CNN module 150.

The example video frame 500 may comprise road lanes 502a-502b. The road lanes 502a-502b may be separated by a lane marker 504. A road sign 506 and a road sign 508 are shown. The road sign 506 may be an exit ramp sign. The road sign 508 may be a speed limit sign (e.g., a speed limit for an off-ramp). In the example shown in the video frame 500, the ego vehicle 50 may be driving on a highway that may continue on the road lane 502a and have an off-ramp by using the road lane 502b.

A transport truck 510 is shown on the road lane 502a. The transport truck 510 may be past the off-ramp for the road lane 502b (e.g., the transport truck 510 may be continuing on the highway). Clouds of exhaust fumes 512a-512b are shown being emitted from the transport truck 510. The clouds of exhaust fumes 512a-512b may be visual indicators of poor air quality.

A dotted box 520 is shown around the transport truck 510. The dotted box 520 may represent the computer vision operations detecting objects. For example, the CNN module 150 may detect and/or classify the transport truck 510 as the object 520. Dotted boxes 522a-522b are shown around respective clouds of exhaust fumes 512a-512b. The dotted boxes 522a-522b may represent the computer vision operations detecting objects. For example, the CNN module 150 may detect and/or classify the clouds of exhaust smoke 512a-512b as the objects 522a-522b.

The processors 106a-106n may be configured to analyze the characteristics of the clouds of exhaust smoke 512a-512b. For example, the processors 106a-106n may analyze characteristics such as the thickness of the clouds of exhaust smoke 512a-512b, the size of the clouds of exhaust smoke 512a-512b, the color of the clouds of exhaust smoke 512a-512b, etc. For example, the decision module 158 may determine that if the ego vehicle 50 is close to the transport truck 510, then the air recirculation system 116 should be activated.

A dotted arrow P_SMOG is shown. The dotted arrow P_SMOG may represent a path of travel of the transport truck 510. For example, the path P_SMOG of the transport truck 510 may be traveling on the road lane 502a and continuing along the road lane 502a. The path of travel of objects, such as the path P_SMOG, determined by the processors 106a-106n may comprise visual indicators that may be used to estimate and/or predict the air quality near the ego vehicle 50.

A dotted arrow P_EGO is shown. The dotted arrow P_EGO may represent a path of travel of the ego vehicle 50. For example, the path P_EGO of the ego vehicle 50 may be to exit the highway on the off-ramp 502b. For example, the ego vehicle 50 may have previously been following the transport truck 510 in the highway lane 502a and then exits the highway using the off-ramp 502b.

The path P_SMOG of the transport truck 510 may be determined using the computer vision operations. The processors 106a-106n may detect the object 520 in the example video frame 500 and continue to monitor the movement of the transport truck 510 over a sequence of video frames. The processors 106a-106n may determine the spatial relationship between the object 520 and the roadway lanes 502a-502b. For example, the processors 106a-106n may distinguish between which of the roadway lanes 502a-502b that the transport truck 510 is driving on.

In some embodiments, the sensor fusion module 152 may make an inference about the path P_SMOG based on map data. For example, the sensor fusion module 152 may receive data from the sensors 114 (e.g., GPS information and/or ADAS information) that provides information about where the roadway lanes 502a-502b lead. For example, if the transport truck 510 is detected on the roadway lane 502a using computer vision, the processors 106a-106n may predict where the transport truck 510 will eventually be based on the map data about the roadway lane 502a.

In some embodiments, the sensor fusion module 152 may make an inference about the path P_SMOG based on information received from the communication device 110. The communication device 110 may be configured to perform vehicle-to-vehicle communication. For example, the transport truck 510 may communicate information that the transport truck 510 will be continuing on the roadway lane 502a to nearby vehicles. The communication device 110 may receive the vehicle-to-vehicle communication message and the sensor fusion module 152 may use the information to generate inferences. The computer vision operations may continue to monitor the transport truck 510 to ensure that the transport truck 510 is detected moving according to the information of the vehicle-to-vehicle communication message.

The path P_EGO may be determined based on readings from the sensors 114. For example, if the ego vehicle 50 is being driven autonomously, the autonomous driving system may provide information about where the ego vehicle 50 will be driven. In another example, if the ego vehicle 50 is being controlled by the driver 202, the sensors 114 may provide information about the travel direction (e.g., the speed, direction, acceleration, GPS/GNSS location data, etc.) of the ego vehicle 50. The sensor fusion module 152 may combine the information from the sensors 152 to determine the path P_EGO. In some embodiments, the computer vision operations may be used to determine the path P_EGO. For example, the processor 106a-106n may be configured to compare changing spatial relationships between objects detected (e.g., objects becoming larger in size over time indicates that the ego vehicle 50 is moving towards an object, objects becoming smaller in size over time indicates that the ego vehicle 50 is moving farther away from an object, etc.). The processors 106a-106n may use knowledge of the locations of the lenses 112a-112n on the ego vehicle 50, with the results of the object detection to determine the direction and/or speed of the ego vehicle 50.

The processors 106a-106n may compare the path P_EGO of the ego vehicle 50 with the path P_SMOG of the transport truck 510 emitting the pollution 512a-512b. In one example, if the path P_EGO is determined to follow the same path P_SMOG of the transport truck 510, then the processors 106a-106n may activate the air recirculation system 116. In the example shown, the path P_EGO may diverge from the path P_SMOG. The ego vehicle 50 may take the off-ramp 502b and may not end up near the clouds of exhaust fumes 512a-512b. Since the ego vehicle 50 may not be near the clouds of exhaust fumes 512a-512b the air recirculation system 116 may not be activated by the processors 106a-106n. The distance from the source of the exhaust fumes 512a-512b and the ego vehicle 50 and/or the amount of divergence between the path P_SMOG and the path P_EGO, that may be used to activate/deactivate the air recirculation system 116 may be varied according to the design criteria of a particular implementation.

In some embodiments, the computer vision operations and/or the path comparisons may be used to deactivate the air recirculation system 116. For example, before the example video frame 500 was captured, the ego vehicle 50 may have been following the transport truck 510 on the highway lane 502a. The processors 106a-106n may have previously detected the clouds of exhaust smoke 512a-512b and activated the air recirculation system 116. When the ego vehicle 50 changes lanes to the off-ramp 502b, the processors 106a-106n may compare the path P_SMOG to the path P_EGO and determine that the ego vehicle 50 is moving far enough away from the transport truck 510 that the clouds of exhaust smoke 512a-512b may not affect the driver 202. In response to detecting that the clouds of exhaust smoke 512a-512b may not affect the driver 202 anymore, the processors 106a-106n may generate the signal VCTRL to deactivate the air recirculation system 116.

The processors 106a-106n may further utilize the map data to determine how much the path P_SMOG and the path P_EGO may diverge. For example, the off-ramp lane 502b may continue to run alongside the highway lane 502a, which may cause the clouds of exhaust smoke 512a-512b to continue to affect the driver 202 even if the exhaust clouds 512a-512b are no longer visible in the various fields of views of the lenses 112a-112n. The processors 106a-106n may determine that the transport truck 510 may continue on the highway lane 502a and determine where the highway lane 502a leads to using the map data. The processors 106a-106n may further determine that the ego vehicle 50 may change to the off-ramp lane 502b and determine where the off-ramp lane 502b leads using the map data. By comparing where the highway road 502a and the off-ramp road 502b each lead, the processors 106a-106n may predict how far away the ego vehicle 50 may be from the clouds of exhaust smoke 512a-512b to determine whether to toggle the air recirculation system 116.

The processors 106a-106n may be further configured to compare the spatial relationship of the location of the clouds of exhaust smoke 512a-512b with the location of the driver 202 and/or the ego vehicle 50. In the example shown, the clouds of exhaust smoke 512a-512b are being released above the transport truck 510. The processors 106a-106n may determine a location (e.g., an altitude) of the detected objects 522a-522b. If the ego vehicle 50 is a consumer vehicle, the ego vehicle 50 may be close to the ground and the clouds of exhaust smoke 512a-512b may be released upwards and far above the ego vehicle 50. Since the clouds of exhaust smoke 512a-512b may dissipate upwards, the clouds of exhaust smoke 512a-512b may not fall down to the ego vehicle 50. For example, the processors 106a-106n may determine that the air recirculation system 116 should not be activated regardless of the path P_SMOG and the path P_EGO because the clouds of exhaust smoke 512a-512b may be released too high up to ever affect the driver 202. The spatial relationship of the location of pollution and the location of the driver 202 within the ego vehicle 50 may be a visual indicator of the air quality.

Figure 7:
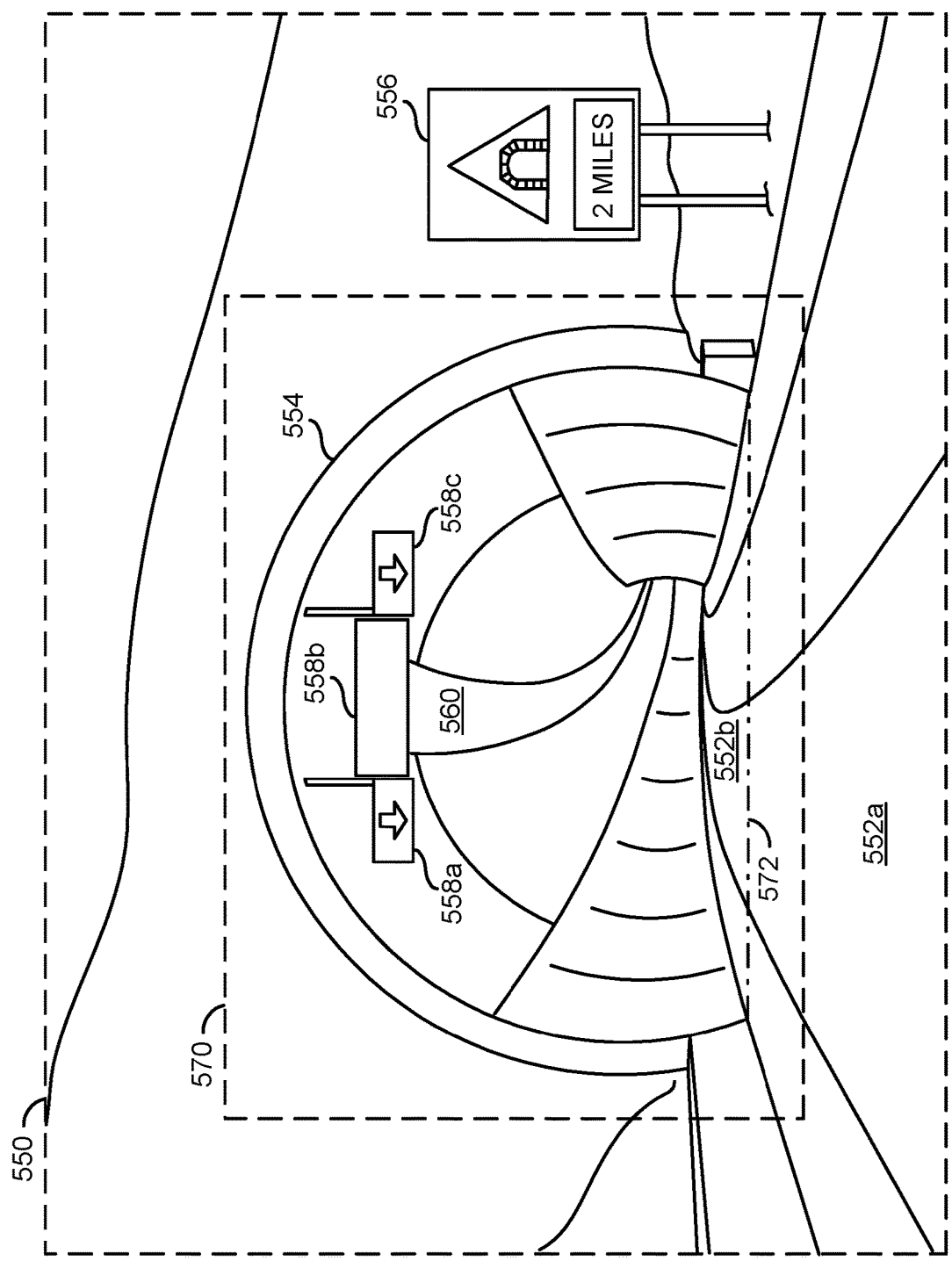
FIG. 7 is a diagram illustrating using computer vision to detect entry into an enclosed environment.

Referring to FIG. 7, a diagram illustrating using computer vision to detect entry into an enclosed environment is shown. An example video frame 550 is shown. The example video frame 550 may be generated similar to the video frame 400 shown in association with FIG. 4. The example video frame 550 may be one example video frame from a sequence of video frames analyzed by the CNN module 150.

The example video frame 550 may comprise a roadway 552a-552b. The ego vehicle 50 may be traveling on the roadway 552a and approaching the roadway 552b. In an example, the video frame 550 may be a video frame generated from pixel data captured by the front facing capture device 102e (e.g., from the field of view 208a-208b captured by the lens 112e). The example video frame 550 may be a view of the external area in front of the ego vehicle 50.

A tunnel opening 554 is shown. The ego vehicle 50 may be approaching the tunnel opening 554. A road sign 556 is shown beside the roadway 552. The road sign 556 may provide an indication that a tunnel is ahead. The road sign 556 may further comprise other information (e.g., how long the tunnel is, how many lanes the tunnel is, a clearance of the tunnel, etc.). Overhead signs 558a-558c are shown hanging from a ceiling of a tunnel 560. The overhead signs 558a-558bc may comprise information such as which lanes to use, a speed limit, a clearance, etc.

The tunnel opening 554 may be an opening for the tunnel 560. The tunnel 560 may form a generally enclosed space. The ceiling and walls of the tunnel 560 may limit the movement of air, the dissipation of exhaust fumes and/or limit an amount of air ventilation compared to the open sky. For example, exhaust fumes emitted by vehicles within the tunnel 560 may be generally contained within the tunnel 560. Exhaust fumes may escape the tunnel 560 via ventilation implemented in the tunnel 560. However, the exhaust fumes may be contained in the tunnel 560 until ventilated. The exhaust fumes may linger in the air of the tunnel 560 longer than in an unenclosed space.

A dotted box 570 is shown. The dotted box 570 may represent an object detected by the computer vision operations performed by the processors 106a-106n. The dotted box 570 may represent the computer vision operations detecting objects. For example, the CNN module 150 may detect and/or classify the tunnel entrance as the object 570. Detecting a tunnel entrance and/or a tunnel exit may be a visual indicator of a change in air quality.

While the tunnel opening 554 is shown as the detected object 570, the processors 106a-106n may detect multiple different types of object simultaneously. In one example, the processors 106a-106n may detect the sign 556. The processors 106a-106n may perform OCR on the sign 556 to determine what is written on the sign 556 and/or recognize the sign 556 as a particular type of road sign (e.g., a stop sign, a yield sign, an off-ramp exit sign, a speed limit sign, etc.). In the example shown, the processors 106a-106n, may read the sign 556, recognize that the sign 556 indicates the tunnel 560 is ahead, and/or read that the tunnel 560 is a two mile long tunnel. The number and/or types of objects detected by the processors 106a-106n when analyzing the example video frame 550 may be varied according to the design criteria of a particular implementation.

A dotted line 572 is shown at the entrance of the tunnel 560. For example, the dotted line 572 may be aligned with the tunnel opening 554. The roadway portion 552a may be on one side of the dotted line 572 (e.g., outside the tunnel 560). The roadway portion 552b may be on another side of the dotted line 572 (e.g., inside the tunnel 560). The dotted line 572 may be an example of the computer vision operations performed by the processors 106a-106n. For example, the dotted line 572 may represent the processors 106a-106n determining the threshold of the tunnel opening 554.

The processors 106a-106n may be configured to detect enclosed and/or partially enclosed spaces. The tunnel 560 may be an example of a partially enclosed space. The detection of the object 570 may recognize the tunnel entrance 554. The tunnel entrance 554 may indicate that the ego vehicle 50 may be entering the tunnel 560. The detection of the tunnel entrance 554 may be used to determine when to activate the air recirculation system 116. Similarly, the processors 106a-106n may detect a tunnel exit when the ego vehicle 50 is within the tunnel 560. The detection of the tunnel exit may be used to determine when to deactivate the air recirculation system 116.

The decision module 158 may use the threshold line 572 to determine when the ego vehicle 50 has entered the tunnel 560. For example, when the ego vehicle 50 is on the road portion 552a, the decision module 158 may not activate the air recirculation system 116 (e.g., unless other factors are detected such as the vehicle queue and/or the detection of exhaust fumes from other vehicles). When the ego vehicle 50 crosses the threshold line 572 (e.g., the ego vehicle 50 is on the roadway portion 552b within the tunnel 560), then the decision module 158 may determine that the ego vehicle 50 is currently within the tunnel 560 and the signal VCTRL should be generated to activate the air recirculation system 116. In some embodiments, the processors 106a-106n may activate the air recirculation system 116 before reaching the threshold line 572 (e.g., to ensure that the air being recirculated is fresh outdoor air instead of the air of the tunnel 560). The precise distance that the ego vehicle 50 is from the tunnel entrance 554 when the processors 106a-106n activate the air recirculation system 116 may be varied according to the design criteria of a particular implementation.

The processors 106a-106n may monitor the threshold location 572 over a sequence of video frames to determine when the ego vehicle 50 has reached the threshold location 572. In an example, the computer vision operations performed by the processors 106a-106n may be configured to identify characteristics of objects at the threshold location 572. For example, the processors 106a-106n may detect characteristics such as road markings, decorative features, the overhead signs 558a-558c, etc. The processors 106a-106n may monitor the change of size and/or orientation of the characteristics identified for the threshold location 572. Monitoring the change of size and/or orientation of the characteristics may enable the processors 106a-106n to recognize the threshold location 572 as being the same location from a distance as the ego vehicle 50 moves closer to the threshold location 572.

In some embodiments, the processors 106a-106n may perform the computer vision operations to read the sign 556 and/or the overhead signs 558a-558c. The sign 556 and/or the overhead signs 558a-558c may provide an indication of the length of the tunnel 560. In the example shown, the sign 556 may indicate that the tunnel 560 is approximately 2 miles long. The processors 106a-106n may determine the current speed of the ego vehicle 50 (e.g., by reading from the sensors 114) and/or read the sign 556 and/or the overhead signs 558a-558c to determine a speed limit within the tunnel 560. The processors 106a-106n may determine an estimated amount of time that the ego vehicle 50 will be driving within the tunnel 560 based on the speed of the ego vehicle 50 and the length of the tunnel 560. The estimated amount of time may be used as a secondary check to determine whether the computer vision operations are correctly detecting the entrances/exits of the tunnel 560. For example, if the air recirculation system 116 has been activated for significantly longer than the estimated amount of time, then there may have been an error in the detection of the exit of the tunnel 560. The processors 106a-106n may continually monitor the speed of the ego vehicle 50 (e.g., to determine whether the speed has dropped, which may increase the amount of time that the ego vehicle 50 is within the tunnel) and/or perform the computer vision operations check for conditions that may cause an extended amount of time within the tunnel 560 (e.g., check for a queue of vehicles as shown in association with FIG. 5 to detect a traffic jam in the tunnel 560).

Figure 8:
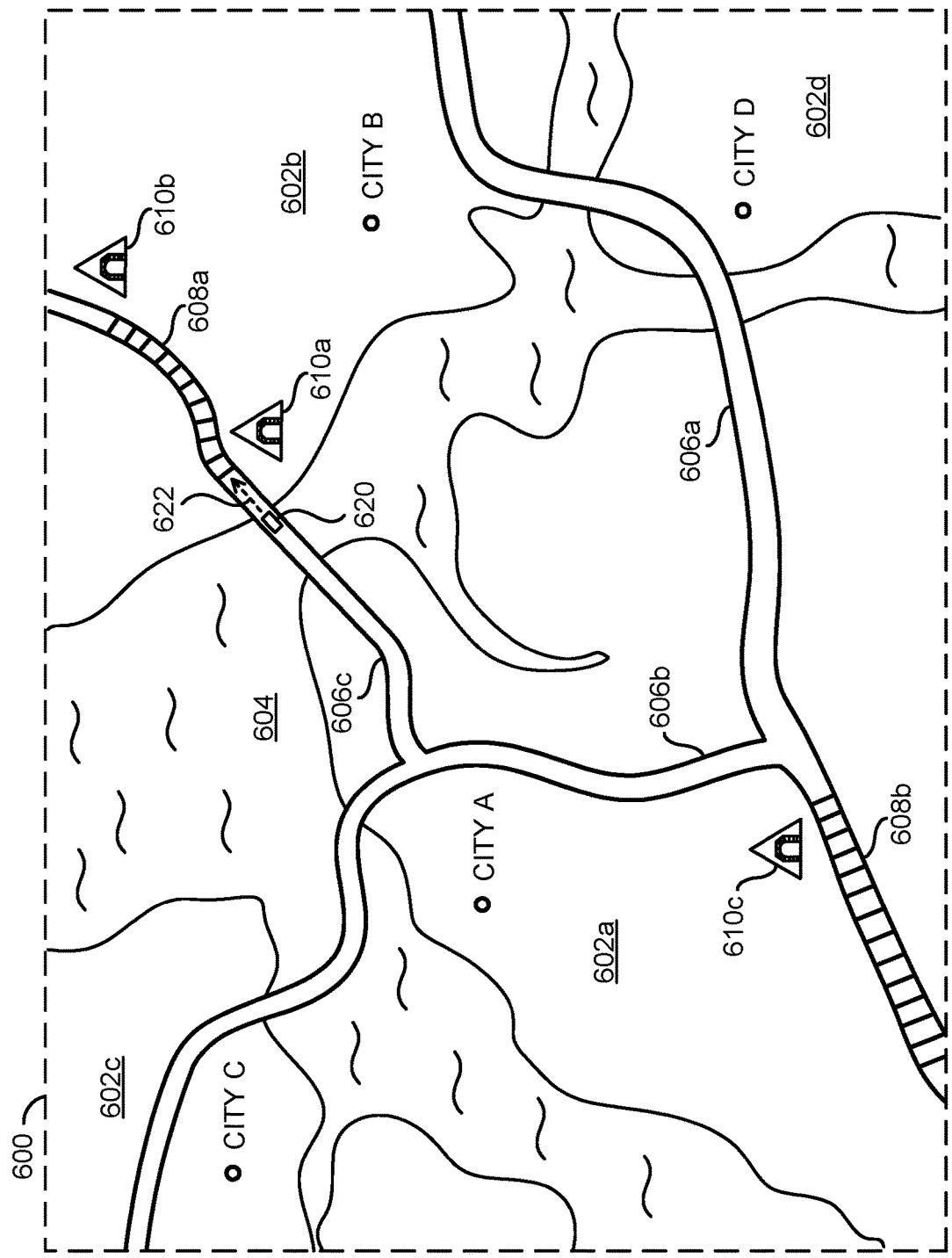
FIG. 8 is a diagram illustrating detecting enclosed environments based on roadway data.

Referring to FIG. 8, a diagram illustrating detecting enclosed environments based on roadway data is shown. Map data 600 is shown. In one example, the map data 600 may be generated from GPS/GNSS data. In another example, the map data 600 may be generated from ADAS data. In yet another example, the map data 600 may be received from third-party map data (e.g., Google Maps). The map data 600 may be received by the communication devices 110 (e.g., received from the interne via a Wi-Fi connection). The map data may be received by one or more of the sensors 114 (e.g., a GPS device). The source of the map data 600 may be varied according to the design criteria of a particular implementation.

The map data 600 may be implemented for other purposes (e.g., navigation, traffic information, etc.). The apparatus 100 may utilize the map data 600 to determine when to activate/deactivate the air recirculation system 116. In the example shown, the map data 600 is represented as a bird's eye view that may be readable by a person for navigation. In some embodiments, the map data 600 may comprise computer readable data and the processors 106a-106n may be configured to read the map data 600 to understand the environment around the ego vehicle 50.

The map data 600 is shown comprising land masses 602a-602d. In an example, the land mass 602a may correspond to a city (e.g., City A), the land mass 602b may correspond to a city (e.g., City B), the land mass 602c may correspond to a city (e.g., City C) and the land mass 602d may correspond to a city (e.g., City D). The land masses 602a-602d may be separated by water 604.

Roads 606a-606c are shown on the map data 600. The roads 606a-606c may connect the land masses 602a-602d and/or cross over the water 604. The road 606a may connect the land mass 602b to the land mass 602d and then connect to the land mass 602a. The road 606b may branch off from the road 606a on the land mass 602a and connect the land mass 602a to the land mass 602c. The road 606c may branch from the road 606b on the land mass 602a and connect the land mass 602a to the land mass 602b.

Tunnels 608a-608b are shown on the map data 600. The tunnel 608a is shown as a shaded portion of the road 606c on the land mass 602b. The tunnel 608b is shown as a shaded portion of the road 606a on the land mass 602a. Symbols 610a-610c are shown on the map data 600. The symbols 610a-610c may provide indicators of entrances/exits of the tunnels 608a-608b. In the example shown, the symbol 610a may correspond to one entrance/exit of the tunnel 608a, the symbol 610b may correspond to another entrance/exit of the tunnel 608a and the symbol 610c may correspond to one entrance/exit of the tunnel 608b (e.g., the other entrance/exit of the tunnel 608b is not shown in the map data 600). The tunnels 608a-608b and/or the entrances/exits 610a-610c may represent features of the map data 600 that may be detected by the processors 106a-106n that affect the air quality near the ego vehicle 50.

An icon 620 is shown on the map data 600. The icon 620 may represent the ego vehicle 50. The icon 620 may represent the location of the ego vehicle 50 with respect to the map data 600. In the example shown, the ego vehicle 50 may be located on the road 606c over the water 604.

An arrow 622 is shown on the map data 600. The arrow 622 may represent a direction of travel of the ego vehicle 50. In the example shown, the ego vehicle 50 may be on the road 606c over the water 604 and traveling from the land mass 602a towards the land mass 602b. The direction of travel 622 may indicate that the ego vehicle 50 may be approaching the tunnel 608a. For example, the processors 106a-106n may determine that the tunnel 608a may be in the path of the ego vehicle 50 and the tunnel 608a may reduce an air quality near the ego vehicle 50.

In some embodiments, the processors 106a-106n may use the map data 600 to determine when to toggle the activation/deactivation of the air recirculation system 116. The processors 106a-106n may determine the location of the tunnels 608a-608b with respect to the ego vehicle 50 based on the map data 600. For example, when the ego vehicle 50 enters one of the tunnels 608a-608b, the processors 106a-106n may determine that the ego vehicle 50 is in an enclosed space by using the information from the map data 600 and generate the signal VCTRL to activate the air recirculation system 116. In another example, when the ego vehicle 50 exits one of the tunnels 608a-608b, the processors 106a-106n may determine that the ego vehicle 50 has left the enclosed space using the information from the map data 600 and generate the signal VCTRL to deactivate the air recirculation system 116.

The timing of the activation/deactivation of the air recirculation system 116 may not need to be exact. There may not be any significant harm if the air recirculation system 116 is activated/deactivated slightly too early or too late. For example, the air recirculation system 116 may be activated before entering the tunnels 608a-608b. In another example, the air recirculation system 116 may be deactivated slightly before exiting the tunnels 608a-608b. Since the activation/deactivation of the air recirculation system 116 may not need to be exact, the processors 106a-106n may rely on the map data 600, which may have a degree of inaccuracy, to determine when to activate/deactivate the air recirculation system 116.

In the example shown, the icon 620 and the direction of travel arrow 622 may indicate that the ego vehicle 50 is approaching the tunnel 608a. Based on the direction of travel 622, the symbol 610a may represent an entrance of the tunnel 608a and the symbol 610b may represent an exit of the tunnel 608a. Whether the symbols 610a-610b correspond to entrances or exits may be determined by the processors 106a-106n based on the direction of travel 622 of the ego vehicle 50. Before the ego vehicle 50 is in the tunnel 608a, the air recirculation system 116 may be in a deactivated state. When (or as) the ego vehicle 50 reaches the location (e.g., GPS/GNSS coordinates) on the map data 600 that corresponds to the tunnel entrance 610a, the processors 106a-106n may activate the air recirculation system 116. The air recirculation system 116 may remain active while the ego vehicle 50 is within the tunnel 608a. When (or as) the ego vehicle 50 reaches the location on the map data 600 that corresponds to the tunnel exit 610b, the processors 106a-106n may deactivate the air recirculation system 116.

The sensor fusion module 152 may be configured to combine the map data 600 with the results of computer vision operations. The sensor fusion module 152 may enable the decision module 158 to determine when to activate and/or deactivate the air recirculation system 116 based on inferences determined in response to both the map data 600 and the results of the computer vision operations. In one example, the map data 600 may be used to activate the air recirculation system 116 when the ego vehicle reaches the tunnel entrance 610*a*. However, while within the tunnel 608*a*, the GPS/GNSS readings used to determine the location of the ego vehicle 50 may be unavailable and the current location of the ego vehicle 50 may be unknown until the GPS/GNSS connection becomes available again, which may be some time after the ego vehicle 50 exits the tunnel 608*a*. In some embodiments, processors 106*a*-106*n* may perform the computer vision operations within the tunnel 608*a* and determine when the tunnel exit 610*b* has been reached by the ego vehicle 50. The air recirculation system 116 may be deactivated when the computer vision operations detect the tunnel exit 610*b*.

Figure 9:
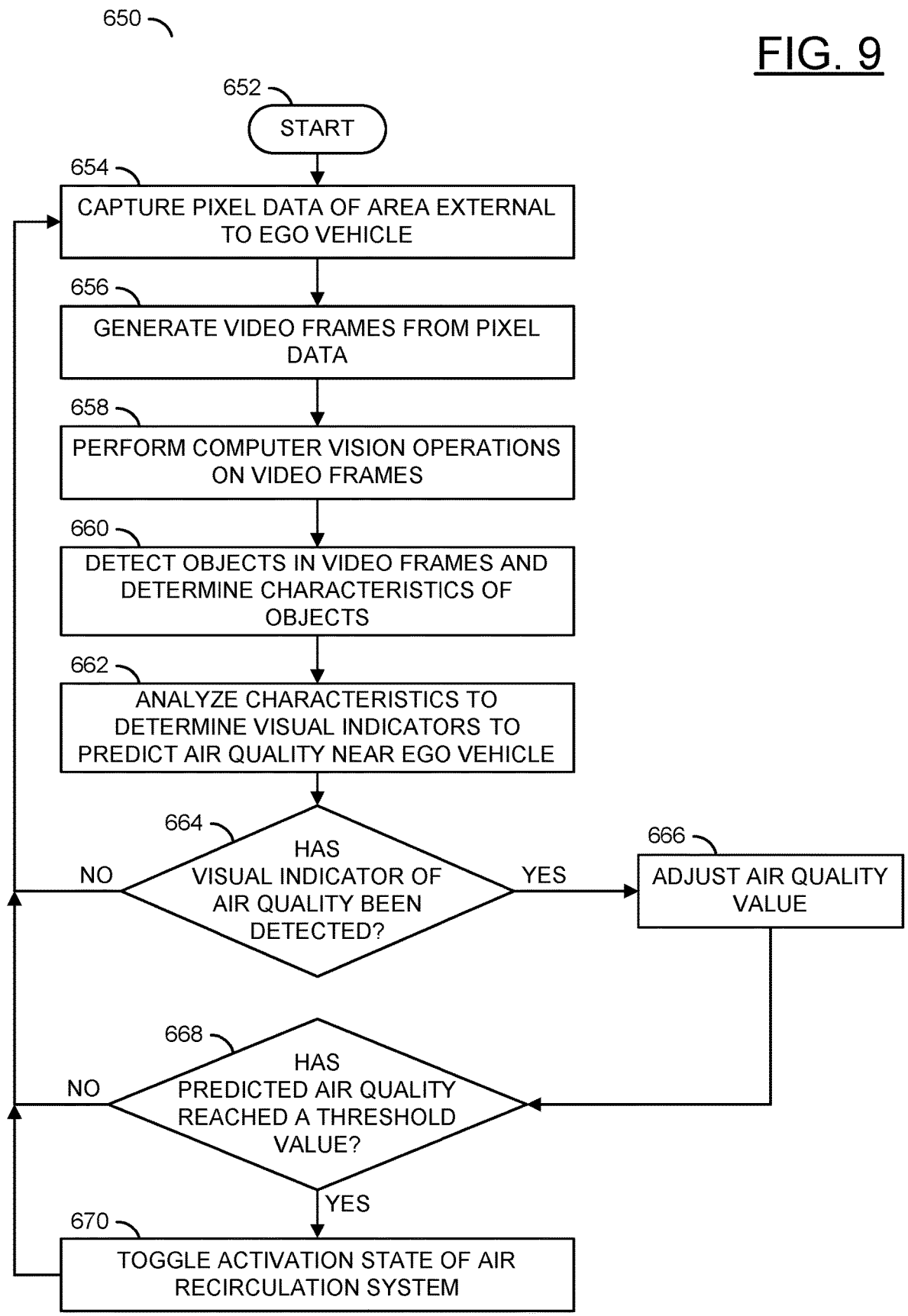
FIG. 9 is a flow diagram illustrating a method for toggling an activation state of an air recirculation system in response to visual indicators of air quality.

Referring to FIG. 9, a method (or process) 650 is shown. The method 650 may toggle an activation state of an air recirculation system in response to visual indicators of air quality. The method 650 generally comprises a step (or state) 652, a step (or state) 654, a step (or state) 656, a step (or state) 658, a step (or state) 660, a step (or state) 662, a decision step (or state) 664, a step (or state) 666, a decision step (or state) 668, and a step (or state) 670.

The step 652 may start the method 650. In the step 654, the capture devices 102*a*-102*n* may capture pixel data in response to the light input IM_A-IM_N received by the lenses 112*a*-112*n*. The pixel data may correspond to an area external to the ego vehicle 50. Next, in the step 656, the processors 106*a*-106*n* may generate the video frames (e.g., the example video frame 400 shown in association with FIG. 4) from the pixel data. In an example, the video processing pipeline 156 may receive the pixel data FRAMES_A-FRAMES_N and convert the pixel data into video frames. In another example, the capture devices 102*a*-102*n* may be configured to generate video frames and communicate the video frames FRAMES_A-FRAMES_N to the processors 106*a*-106*n*. In the step 658, the CNN module 150 may perform the computer vision operations on the video frames. The computer vision operations may be performed according to the configuration of the dedicated hardware modules 180*a*-180*n*. Next, the method 650 may move to the step 660.

In the step 660, the CNN module 150 may detect objects (e.g., the truck 406, the road 402, the lane markers 404*a*-404*b*, the smog clouds 412*a*-412*b*, etc.) and determine characteristics of the detected objects (e.g., the characteristics of the detected objects 410*a*-410*b*). Next, in the step 662, the CNN module 150 may analyze the characteristics of the detected objects 410*a*-410*b* to determine visual indicators that may predict an air quality near the ego vehicle 50. In an example, the visual indicators may comprise analyzing a color of exhaust smoke, a density of exhaust smoke, analyzing a speed and/or orientation of nearby vehicles to detect a vehicle queue, detecting tunnel entrances/exits, etc. Next, the method 650 may move to the decision step 664.

In the decision step 664, the decision module 158 may determine whether a visual indicator of air quality has been detected. In an example, the CNN module 150 may comprise a library of neural networks that may detect various types of visual indicators of air quality. The library of visual indicators of air quality may be continually updated by implementing ongoing training of the neural networks. If a visual indicator of air quality has not been detected, then the method 650 may return to the step 654. If a visual indicator of air quality has been detected, then the method 650 may move to the step 666. In the step 666, the decision module 158 may adjust an air quality value. The air quality value may be a value stored in the memory 108 that may be used to track a current air quality. In one example, the air quality value may be a cumulative score of an air quality that may be increased or decreased as visual indicators of air quality are detected. Next, the method 650 may move to the decision step 668.

In the decision step 668, the decision module 158 may determine whether the predicted air quality has reached a threshold value. The predicted air quality may be determined based on the air quality value. The air quality value may be compared to a pre-determined threshold value. The pre-determined threshold value may be stored in the memory 108. The pre-determined threshold value may be a value configured based on studies of human health (e.g., an approximation of an acceptable level of air quality), recommended values based on aggregating statistics and/or preferences from multiple people, settings (e.g., preferences) input by the driver 202, etc. The pre-determined threshold value may comprise an upper threshold bound and a lower threshold bound. For example, the upper threshold bound may be used to determine when the air quality is predicted to be high enough to deactivate the air recirculation system 116 and the lower threshold bound may be used to determine when the air quality is predicted to be low enough to activate the air recirculation system 116.

In the decision step 668, if the predicted air quality has not reached the threshold value, then the method 650 may return to the step 654. For example, if the air quality is considered good and the air recirculation system 116 is currently in an off state, then no action may be needed from the processors 106*a*-106*n*. Similarly, if the air quality is considered bad and the air recirculation system 116 is currently in an on state, then no action may be needed from the processors 106*a*-106*n*. If the predicted air quality has reached the threshold value, then the method 650 may move to the step 670. In the step 670, the processors 106*a*-106*n* may toggle the activation state of the air recirculation system 116. For example, the signal VCTRL may be generated to toggle the air recirculation system 116 from off to an on state or from on to an off state. Next, the method 650 may return to the step 654.

Figure 10:
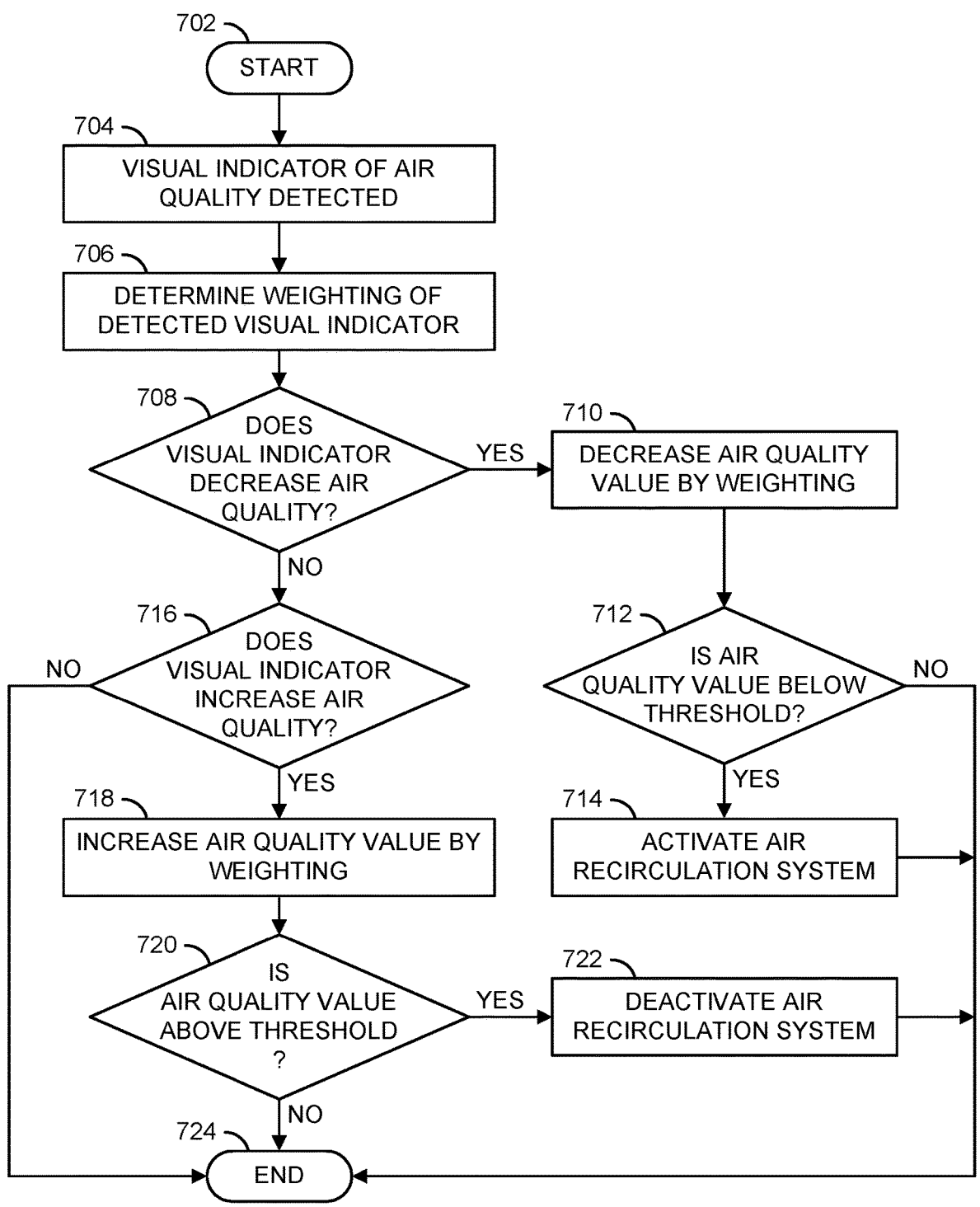
FIG. 10 is a flow diagram illustrating a method for determining an effect of visual indicators of air quality on an air quality value.

Referring to FIG. 10, a method (or process) 700 is shown. The method 700 may determine an effect of visual indicators of air quality on an air quality value. The method 700 generally comprises a step (or state) 702, a step (or state) 704, a step (or state) 706, a decision step (or state) 708, a step (or state) 710, a decision step (or state) 712, a step (or state) 714, a decision step (or state) 716, a step (or state) 718, a decision step (or state) 720, a step (or state) 722, and a step (or state) 724.

The step 702 may start the method 700. In the step 704, the CNN module 150 may detect a visual indicator of air quality in response to analyzing the video frames generated by the processors 106*a*-106*n*. Next, in the step 706, the decision module 158 may determine a weighting value of the detected visual indicator. Next, the method 700 may move to the decision step 708.

In the decision step 708, the decision module 158 may determine whether the visual indicator provides an indication of decreased air quality. Whether the visual indicator provides an indication of increased or decreased air quality may be determined based on the weighting values for the particular visual indicator detected. If the visual indicator indicates a decrease in air quality, then the method 700 may move to the step 710. In the step 710, the processors 106*a*-106*n* may decrease the air quality value by the weighting amount. Next, the method 700 may move to the decision step 712.

In the decision step 712, the processors 106a-106n may determine whether the air quality value has moved below the pre-determined threshold (e.g., a lower air quality threshold value). If the air quality value has not moved below the threshold value, then the method 700 may move to the step 724 (e.g., no change to the status of the air recirculation system 116). If the air quality value has moved below the threshold value, then the method 750 may move to the step 714. In the step 714, the processors 106a-106n may generate the signal VCTRL configured to activate the air recirculation system 116 (e.g., toggle to the on state). Next, the method 700 may move to the step 724.

In the decision step 708, if the visual indicator does not indicate a decrease in air quality, then the method 700 may move to the decision step 716. In the decision step 716, the decision module 158 may determine whether the visual indicator provides an indication of increased air quality. If the visual indicator does not indicate an increase in air quality, then the method 700 may move to the step 724 (e.g., no change to the status of the air recirculation system 116). If the visual indicator indicates an increase in air quality, then the method 700 may move to the step 718. In the step 718, the processors 106a-106n may increase the air quality value by the weighting amount. Next, the method 700 may move to the decision step 720.

In the decision step 720, the processors 106a-106n may determine whether the air quality value has moved above the pre-determined threshold (e.g., an upper air quality threshold value). If the air quality value has not moved above the threshold value, then the method 700 may move to the step 724 (e.g., no change to the status of the air recirculation system 116). If the air quality value has moved above the threshold value, then the method 750 may move to the step 722. In the step 722, the processors 106a-106n may generate the signal VCTRL configured to deactivate the air recirculation system 116 (e.g., toggle to the off state). Next, the method 700 may move to the step 724. The step 724 may end the method 700.

In an example, the lookup table 170 may store weighting values that correspond to various types of visual indicators. For example, the smog clouds 412a-412b may be an example of a visual indicator of air quality. A thicker density of the smog clouds 412a-412b may correspond to a larger weighting value of poor air quality than smaller/sparse smog clouds. Similarly, a black color of the smog clouds 412a-412b may correspond to a larger weighting value of poor air quality than clear smog clouds. The weighting values may indicate how much of an impact that the visual indicators may have on the air quality value. Each of the visual indicators may have a weighting value. The weighting values may have various modifiers based on characteristics of the visual indicators. For example, a slightly black color of the smog clouds 412a-412b may be a large modifier towards poor air quality. In another a very black color of the smog clouds 412a-412b may be a larger modifier towards poor quality than the slightly black color. The weighting values for various visual indicators and/or characteristics of the visual modifiers may be varied according to the design criteria of a particular implementation.

Figure 11:
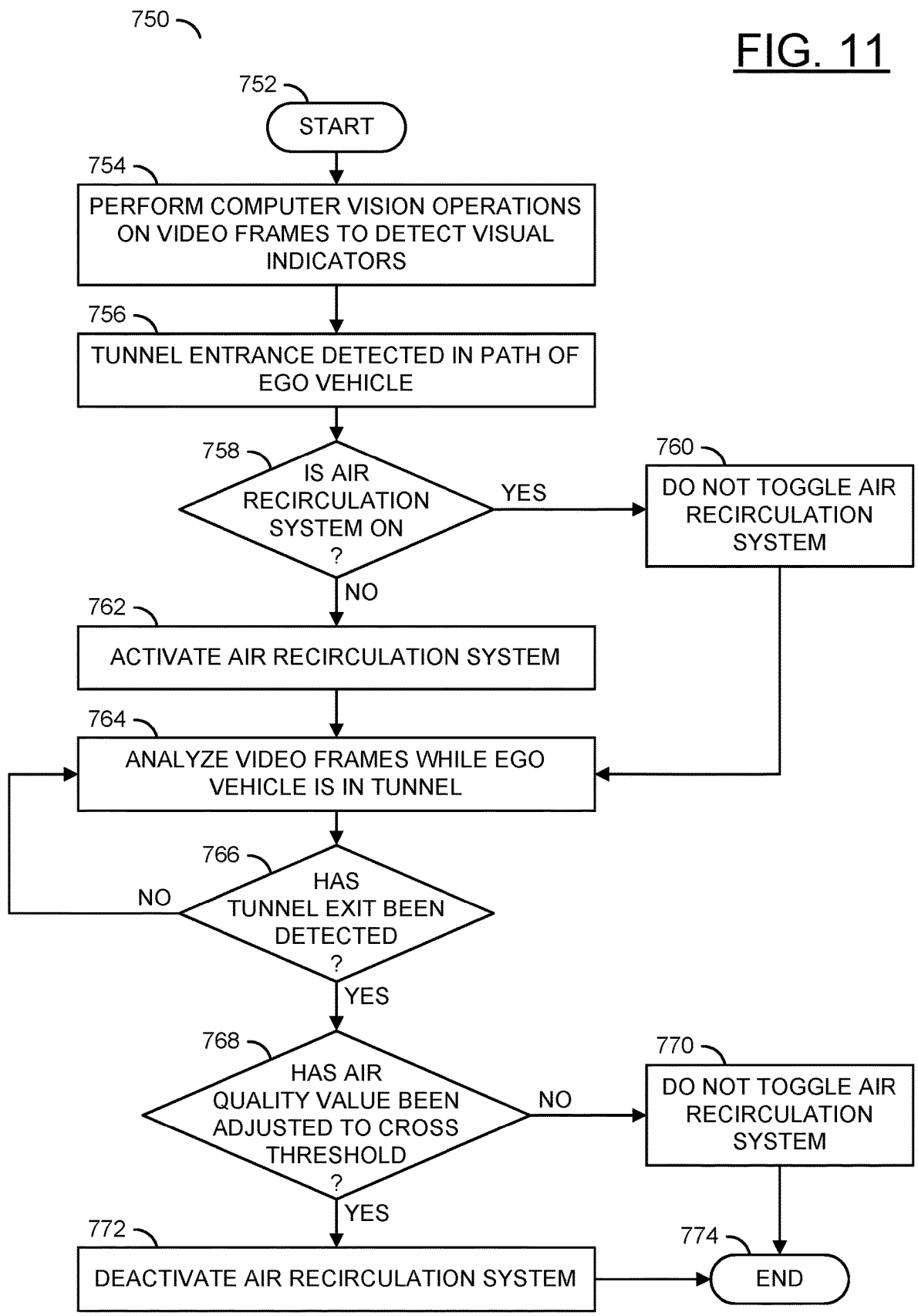
FIG. 11 is a flow diagram illustrating a method for controlling an air recirculation system in response to detecting tunnel entrances and exits.

Referring to FIG. 11, a method (or process) 750 is shown. The method 750 may control an air recirculation system in response to detecting tunnel entrances and exits. The method 750 generally comprises a step (or state) 752, a step (or state) 754, a step (or state) 756, a decision step (or state) 758, a step (or state) 760, a step (or state) 762, a step (or state) 764, a decision step (or state) 766, a decision step (or state) 768, a step (or state) 770, a step (or state) 772, and a step (or state) 774.

The step 752 may start the method 750. In the step 754, the processors 106a-106n may perform the computer vision operations on the video frames to detect the visual indicators of air quality. Next, in the step 756, the processors 106a-106n may detect the tunnel entrance 554 in the path of the ego vehicle 50. For example, the processors 106a-106n may detect the tunnel entrance 554, determine that the ego vehicle 50 is approaching the tunnel entrance 554 (e.g., the size of the detected object 570 is determined to be increasing over time) and/or determine that the road 552a that the ego vehicle 50 is driving on leads to the tunnel entrance 554. Next, the method 750 may move to the decision step 758.

In the decision step 758, the processors 106a-106n may determine whether the air recirculation system 116 is in an on (e.g., active) state. In one example, the interface 104 may read the status of various actuators 116 in the ego vehicle 50. In another example, one of the sensors 114 may read information about the activation state of various actuators 116 in the ego vehicle 50. If the air recirculation system 116 is already on, then the method 750 may move to the step 760. In the step 760, the processors 106a-106n may not toggle the air recirculation system 116. For example, the processors 106a-106n may determine that the air recirculation system 116 is already in the appropriate activation state. Next, the method 750 may move to the step 764.

In the decision step 758, if the air recirculation system 116 is not on, then the method 750 may move to the step 762. In the step 762, the processors 106a-106n may generate the control signal VCTRL to activate the air recirculation system 116. Next, in the step 760, the processors 106a-106n may analyze the video frames generated while the ego vehicle 50 is driving within the tunnel 560. For example, the processors 106a-106n may continually generate and analyze video frames. Next, the method 750 may move to the decision step 766.

In the decision step 766, the processors 106a-106n may determine whether the exit of the tunnel 560 has been detected. For example, the processors 106a-106n may perform similar analysis for detecting the tunnel exit as for the tunnel entrance 554. If the tunnel exit has not been detected, then the decision module 158 may determine that the ego vehicle 50 is still within the tunnel 560 and the method 750 may return to the step 764. If the tunnel exit has been detected, then the method 750 may move to the decision step 768.

In the decision step 768, the processors 106a-106n may determine whether the air quality value has been adjusted to cross the pre-determined threshold. For example, the tunnel exit may be a visual indicator that corresponds to an improvement of air quality. However, other factors (e.g., such as smog being emitted by nearby vehicles) may overcome the positive effect of the tunnel exit on the overall air quality. If the air quality value has not crossed a threshold value, then the method 750 may move to the step 770. In the step 770, the processors 106a-106n may decide not to toggle the activation status of the air recirculation system 116. Next, the method 750 may move to the step 774.

In the decision step 768, if the air quality value has crossed the threshold value, then the method 750 may move to the step 772. In the step 772, the processors 106a-106n may generate the control signal VCTRL to deactivate the air recirculation system 116. Next, the method 750 may move to the step 774. The step 774 may end the method 750.

Figure 12:
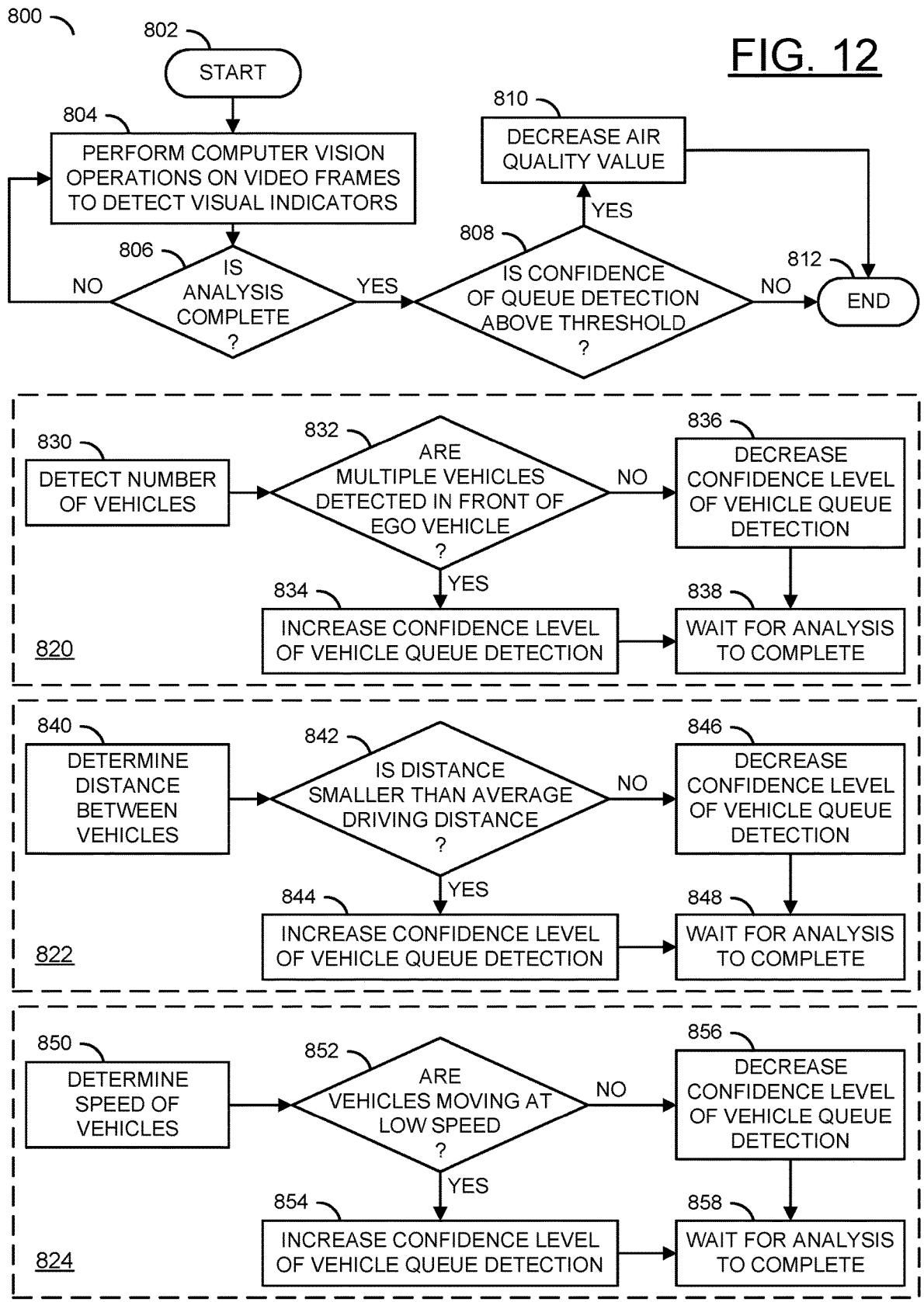
FIG. 12 is a flow diagram illustrating a method for detecting a vehicle queue.

Referring to FIG. 12, a method (or process) 800 is shown. The method 800 may detect a vehicle queue. The method 800 generally comprises a step (or state) 802, a step (or state) 804, a decision step (or state) 806, a decision step (or state) 808, a step (or state) 810, and a step (or state) 812.

The step 802 may start the method 800. In the step 804, the processors 106a-106n may perform the computer vision operations on the video frames to detect the visual indicators of air quality. Next, the method 800 may move to the decision step 806.

In the decision step 806, the processors 106a-106n may determine whether the analysis of the video frames has been completed. Examples of analysis performed to detect the visual indicators of air quality may be described in association with the sub-method 820, the sub-method 822 and/or the sub-method 824. The sub-methods 820-824 may be examples of types of analysis performed to detect a vehicle queue. Other types of sub-methods may be implemented. The completion of the analysis may comprise aggregating the results of the various sub-methods. If the analysis is not complete, then the method 800 may return to the step 804. If the analysis is complete, then the method 800 may move to the decision step 808.

In the decision step 808, the decision module 158 may determine whether a confidence level of a vehicle queue being detected is above a pre-determined threshold. For example, various factors determined by the sub-methods 820-824 may increase or decrease a confidence level of a vehicle queue being detected. The confidence level may represent how likely the decision made by the decision module 158 is to be correct. The level of the pre-determined threshold for the confidence level may be determined based on prior training data, statistical analysis and/or preferences by the driver 202. If the confidence level of the vehicle queue detection is not above the pre-determined threshold, the decision module 158 may determine there is no vehicle queue near the ego vehicle 50 and the method 800 may move to the step 812. If the confidence level of the vehicle queue is above the pre-determined threshold, the decision module 158 may determine that the vehicle queue is near the ego vehicle 50 and the method 800 may move to the step 810. In the step 810, the processors 106a-106n may decrease the air quality value. The air quality value may be decreased by the weighting value that corresponds to a vehicle queue. Next, the method 800 may move to the step 812. The step 812 may end the method 800.

The sub-method 820 may detect a number of vehicles near the ego vehicle 50. The sub-method 820 may be one example analysis performed for determining whether a vehicle queue is near the ego vehicle 50. The sub-method 820 may comprise a step (or state) 830, a decision step (or state) 832, a step (or state) 834, a step (or state) 836 and a step (or state) 838.

In the step 830, the processors 106a-106n may perform the computer vision operations to detect the number of vehicles 458a-458c near the ego vehicle 50. Next, in the decision step 832, the processors 106a-106n may determine whether multiple vehicles 458a-458c are detected in front of the ego vehicle 50. If the multiple vehicles 458a-458c are in front of the ego vehicle 50, then the sub-method 820 may move to the step 834. In the step 834, the processors 106a-106n may increase a confidence level of a detection of a vehicle queue. Next, the sub-method 820 may move to the step 838. In the decision step 832, if the multiple vehicles 458a-458c are not in front of the ego vehicle 50, then the sub-method 820 may move to the step 836. In the step 836, the processors 106a-106n may decrease a confidence level of a detection of a vehicle queue. Next, in the step 838, the sub-method 820 may wait for the analysis (e.g., the other sub-methods) to complete.

The sub-method 822 may determine a distance between vehicles near the ego vehicle 50. The sub-method 822 may be one example analysis performed for determining whether a vehicle queue is near the ego vehicle 50. The sub-method 822 may comprise a step (or state) 840, a decision step (or state) 842, a step (or state) 844, a step (or state) 846 and a step (or state) 848.

In the step 840, the processors 106a-106n may perform the computer vision operations to detect the distances D1-D3 between the ego vehicle 50 and the vehicles 458a-458c. Next, in the decision step 842, the processors 106a-106n may determine whether the distances D1-D3 are smaller than an average driving distance. The average driving distance may be determined based on statistical information about driving and/or driving guidelines (e.g., drive two vehicle lengths away from a car in front). If the distances D1-D3 are smaller than average driving distances, then the sub-method 822 may move to the step 844. In the step 844, the processors 106a-106n may increase a confidence level of a detection of a vehicle queue. Next, the sub-method 822 may move to the step 848. In the decision step 842, if the distances D1-D3 are not smaller than average driving distances, then the sub-method 822 may move to the step 846. In the step 846, the processors 106a-106n may decrease a confidence level of a detection of a vehicle queue. Next, in the step 848, the sub-method 822 may wait for the analysis (e.g., the other sub-methods) to complete.

The sub-method 824 may determine a speed of vehicles near the ego vehicle 50. The sub-method 824 may be one example analysis performed for determining whether a vehicle queue is near the ego vehicle 50. The sub-method 824 may comprise a step (or state) 850, a decision step (or state) 852, a step (or state) 854, a step (or state) 856 and a step (or state) 858.

In the step 850, the processors 106a-106n may perform the computer vision operations to determine the speed of the vehicles 458a-458c near the ego vehicle 50. Next, in the decision step 852, the processors 106a-106n may determine whether the multiple vehicles 458a-458c and the ego vehicle 50 are moving at a low speed (or stopped entirely). If the multiple vehicles 458a-458c are moving at a slow speed, then the sub-method 824 may move to the step 854. In the step 854, the processors 106a-106n may increase a confidence level of a detection of a vehicle queue. Next, the sub-method 824 may move to the step 858. In the decision step 852, if the multiple vehicles 458a-458c are not moving at a slow speed, then the sub-method 824 may move to the step 856. In the step 856, the processors 106a-106n may decrease a confidence level of a detection of a vehicle queue. Next, in the step 858, the sub-method 824 may wait for the analysis (e.g., the other sub-methods) to complete.

Figure 13:
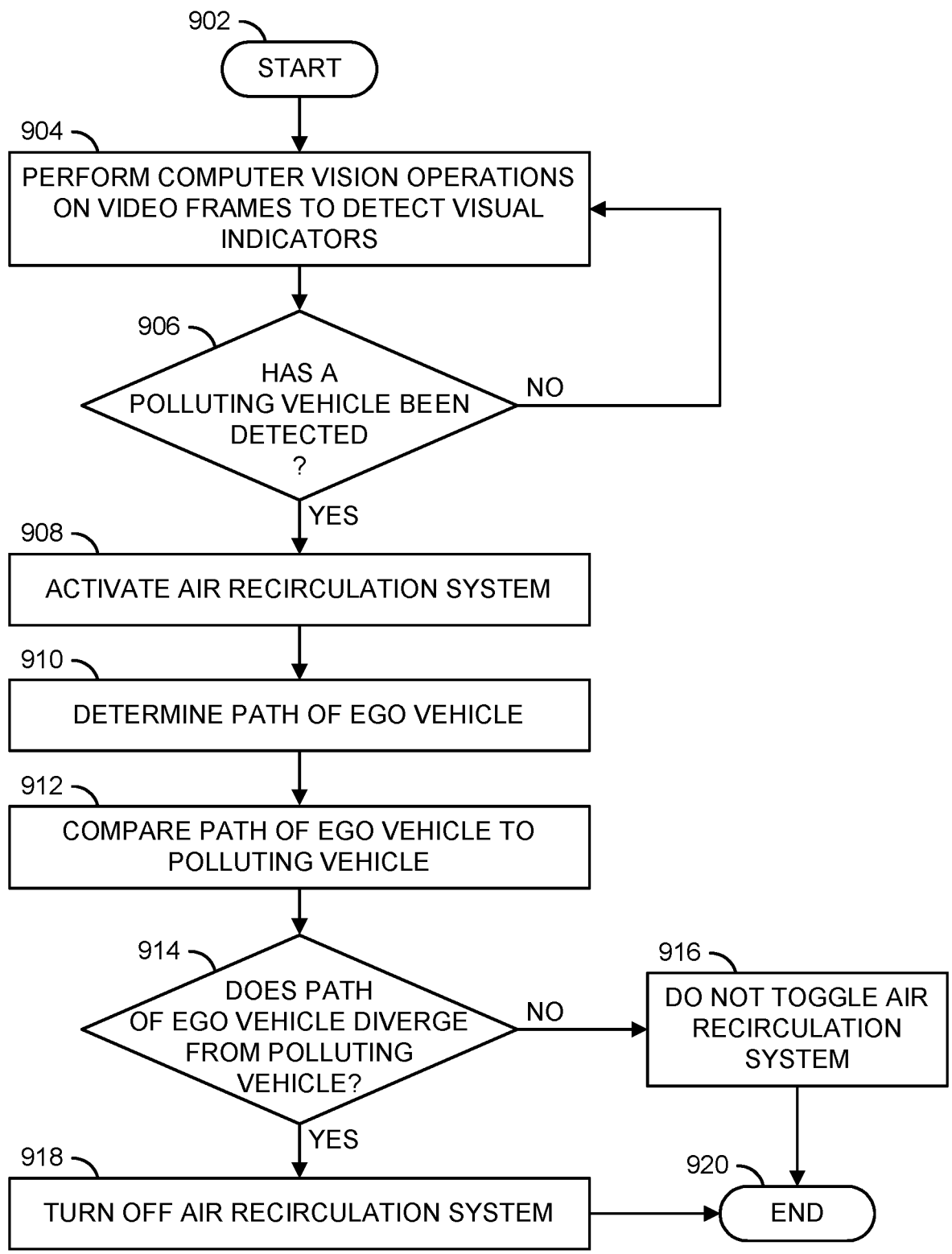
FIG. 13 is a flow diagram illustrating a method for determining a path of a polluting vehicle.

Referring to FIG. 13, a method (or process) 900 is shown. The method 900 may determine a path of a polluting vehicle. The method 900 generally comprises a step (or state) 902, a step (or state) 904, a decision step (or state) 906, a step (or state) 908, a step (or state) 910, a step (or state) 912, a decision step (or state) 914, a step (or state) 916, a step (or state) 918, and a step (or state) 920.

The step 902 may start the method 900. In the step 904, the processors 106a-106n may perform the computer vision operations on the video frames to detect the visual indicators of air quality. Next, the method 900 may move to the decision step 906.

In the decision step 906, the processors 106a-106n may determine whether a polluting vehicle has been detected. For example, the processors 106a-106n may detect a polluting object (e.g., the transport truck 510) by detecting the exhaust clouds 512a-512b and track the polluting object over time (e.g., by analyzing a sequence of video frames). If a polluting vehicle has not been detected, then the method 900 may return to the step 904. If a polluting vehicle has been detected, then the method 900 may move to the step 908.

In the step 908, the processors 106a-106n may generate the control signals VCTRL to activate the air recirculation system 116. Next, in the step 910, the computer vision operations and/or the information read from the sensor 114 may be used to determine the path P_EGO of the ego vehicle 50. In the step 912, the computer vision operations and/or information read from vehicle-to-vehicle communications received by the communication module 110 to determine the path P_SMOG of the polluting vehicle and the processors 106a-106n may compare the path P_EGO to the path P_SMOG. Next, the method 900 may move to the decision step 914.

In the decision step 914, the decision module 158 may determine whether the path P_EGO of the ego vehicle 50 diverges from the path P_SMOG of the polluting vehicle. If the paths do not diverge (e.g., the ego vehicle 50 will continue to follow the polluting vehicle), then the method 900 may move to the step 916. In the step 916, the processors 106a-106n may determine to not toggle the air recirculation system 116. Next, the method 900 may move to the step 920. In the decision step 914, if the paths do diverge (e.g., the ego vehicle 50 will not continue to follow the polluting vehicle), then the method 900 may move to the step 918. In the step 918, the processors 106a-106n may generate the control signal VCTRL to turn off the air recirculation system 116. Next, the method 900 may move to the step 920. The step 920 may end the method 900.

Referring to FIG. 14, a method (or process) 950 is shown. The method 950 may control an air recirculation system in response to analyzing map data. The method 950 generally comprises a step (or state) 952, a step (or state) 954, a step (or state) 956, a step (or state) 958, a step (or state) 960, a decision step (or state) 962, a step (or state) 964, a decision step (or state) 966, and a step (or state) 968.

The step 952 may start the method 950. In the step 954, the processors 106a-106n may perform the computer vision operations on the video frames to detect visual indicators of air quality. Next, in the step 956, the processors 106a-106n may receive the map data 600. For example, the map data 600 may be read from the sensors 114 (e.g., a GPS/GNSS sensor). In the step 958, the processors 106a-106n may determine the location of the ego vehicle 50 with respect to the map data 600. For example, the map data 600 may be used to determine which road the ego vehicle is traveling on, the direction of travel, the location of the ego vehicle 50 with respect to other information in the map data 600, etc. Next, in the step 960, the processors 106a-106n may determine the path of the ego vehicle 50 with respect to the map data 600. For example, the processors 106a-106n may determine the direction of travel 622. Next, the method 950 may move to the decision step 962.

In the decision step 962, the decision module 158 may determine whether there are indicators of reduced air quality in the direction of travel 622 of the ego vehicle 50 on the map data 600. For example, the tunnel entrances/exits 610a-610c may be indicators of reduced air quality. In another example, construction sites may be indicators of reduced air quality. In yet another example farms may be an indicator of reduced air quality. If there are not indicators of reduced air quality in the direction of travel 622 on the map data 600, then the method 950 may return to the step 954. If there are indicators of reduced air quality in the direction of travel 622 on the map data 600, then the method 950 may move to the step 964. In the step 964, the decision module 158 may reduce the air quality value. Next, the method 950 may move to the decision step 966.

In the decision step 966, the processors 106a-106n may determine whether the air quality value has moved below the pre-determined threshold value. If the air quality value has not moved below the threshold value, then the method 950 may return to the step 954. If the air quality value has moved below the threshold value, then the method 950 may move to the step 968. In the step 968, the processors 106a-106n may generate the control signal VCTRL to activate the air recirculation system 116. Next, the method 950 may return to the step 954. The analysis of the map data 600 and the analysis of results of the computer vision operations may be performed in parallel to determine the air quality value.

In some embodiments, the computer vision operations and/or the analysis of the map data 600 may be implemented to detect pollution (e.g., poor quality air that may affect the health of the driver 202). In some embodiments, the computer vision operations and/or the analysis of the map data 600 may be configured to detect indicators of poor air quality that may be undesired by the driver 202. For example, the air quality value may be reduced in response to foul-smelling odors and/or other irritants.

In one example, the computer vision operations may be configured to detect road workers (e.g., construction workers wearing hard hats and yellow vests may be detected, drilling equipment may be detected, etc.). Road workers may produce clouds of particulate dust when drilling cement. The air recirculation system 116 may be activated in response to detecting the construction workers before the ego vehicle 50 reaches the construction workers to prevent the particulate dust from entering the ego vehicle 50.

In another example, some animals emit foul-smelling odors. For example, the dedicated hardware modules 180a-180n may be configured to store neural networks used to detect animals and/or farms. In one example, the air recirculation system 116 may be activated by the processors 106a-106n in response to detecting a skunk as an object. In another example, the air recirculation system 116 may be activated by the processors 106a-106n in response to detecting a dead animal. In yet another example, the air recirculation system 116 may be activated by the processors 106a-106n in response to detecting farmland (e.g., farmland may have a manure smell). For example, the computer vision operations may detect farmland by detecting open fields along the sides of the road that the ego vehicle 50 is driving on and detect farm animals (e.g., cows, horses, etc.).

In some embodiments, the dedicated hardware modules 180a-180n may be configured to store neural networks that correspond to preferences of the driver 202. For example, the driver 202 may have an allergy to particular types of plants. The computer vision operations may be configured to detect the plants and activate the air recirculation system 116 in response to detecting the particular plants selected by the driver 202 to prevent allergens from entering the ego vehicle 50. The types of visual indicators that may be considered to reduce air quality (e.g., objects that produce smog, objects that produce foul smells, objects that produce allergens, etc.) may be varied according to the design criteria of a particular implementation.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data corresponding to an exterior view from a vehicle; and
   a processor configured to (i) process said pixel data arranged as video frames, (ii) perform computer vision operations on said video frames to (a) detect objects in said video frames and (b) determine characteristics of said objects, (iii) analyze said characteristics with respect to said vehicle to determine visual indicators to predict an air quality outside of said vehicle and (iv) generate a control signal in response to an air quality value, wherein
   (a) said control signal is configured to toggle an activation of an air recirculation feature of said vehicle when said air quality value reaches a threshold value,
   (b) said visual indicators are used to adjust said air quality value,
   (c) said visual indicators comprise a plurality of types of factors extracted from said characteristics of said objects that provide evidence for determining said air quality value,
   (d) said processor is configured to compile said plurality of types of factors and apply statistical weighting to said plurality of types of factors to determine said air quality value, and
   (e) said plurality of types of factors comprise a combination of (i) a color of exhaust smoke, (ii) a density of said exhaust smoke, (iii) a distance to said exhaust smoke, (iv) a movement speed of said vehicle and (v) whether said vehicle is determined to be in a vehicle queue.

2. The apparatus according to claim 1, wherein (a) said air quality value is generated to represent a prediction of said air quality based on said visual indicators and (b) said control signal is configured to (i) activate said air recirculation feature when said air quality value is below said threshold value and (ii) deactivate said air recirculation feature when said air quality value is above said threshold value.

3. The apparatus according to claim 1, wherein said processor performs said computer vision operations using a dedicated hardware module configured to (i) extract feature points from said video frames by analyzing (a) pixels of said video frames and (b) groups of pixels of said video frames, (ii) calculate descriptors based on said feature points and (iii) compare said descriptors to stored reference descriptors to determine whether said pixels of said video frames correspond to a particular object.

4. The apparatus according to claim 1, wherein a distance to said objects associated with said visual indicators and a direction of travel of said vehicle are used by said processor to determine a weight value for adjusting said air quality value associated with said visual indicators.

5. The apparatus according to claim 1, wherein (i) said visual indicators comprise a tunnel entrance and a tunnel exit and (ii) said air quality value is (a) decreased in response to detecting said tunnel entrance and (b) increased in response to detecting said tunnel exit.

6. The apparatus according to claim 1, wherein said air quality value is decreased when said vehicle queue is detected.

7. The apparatus according to claim 6, wherein said vehicle queue is inferred in response to (i) detecting a small distance to other vehicles in front of said vehicle and (ii) detecting a low speed of said vehicle.

8. The apparatus according to claim 7, wherein (i) said small distance is detected using said computer vision operations and (ii) said low speed of said vehicle is detected by said processor reading a vehicle sensor.

9. The apparatus according to claim 7, wherein said small distance and said low speed of said vehicle are both detected using said computer vision operations.

10. The apparatus according to claim 1, wherein said air recirculation feature of said vehicle is configured to (i) provide air filtration and (ii) limit an amount of air external to said vehicle from entering said vehicle.

11. The apparatus according to claim 1, wherein said processor is further configured to receive map data from a sensor.

12. The apparatus according to claim 11, wherein said processor is further configured to adjust said air quality value in response to detecting features of said map data that affect said air quality.

13. The apparatus according to claim 12, wherein said features of said map data that reduce said air quality value comprise tunnels in a path of said vehicle.

14. The apparatus according to claim 1, wherein
(a) said computer vision operations detect said objects by performing feature extraction based on weight values for each of a plurality of visual features that are associated with said objects extracted from said video frames,
(b) said weight values are determined in response to an analysis of training data by said processor prior to said feature extraction, and
(c) a data flow of said feature extraction comprises manipulating lists of regions of a vector that each share a common attribute and are grouped together based on said visual features.

15. The apparatus according to claim 6, wherein (a) said vehicle queue is determined in response to a comparing a confidence level to a queue threshold value, and (b) said processor is configured to increase said confidence level in response to (i) detecting a plurality of vehicles in front of said vehicle, (ii) detecting a distance between said vehicle and another vehicle that is smaller than an average driving distance, (iii) detecting that a speed of said vehicle is a low speed and (iv) determining that said vehicle is moving and stopping at intervals.

16. The apparatus according to claim 1, wherein said processor is further configured to (i) perform said computer vision operations on a sequence of said video frames to determine a first path of a polluting vehicle that corresponds to said visual indicators that decrease said air quality value, (ii) determine a second path of said vehicle, (iii) compare said first path to said second path, (iv) decrease said air quality value if said first path and said second path do not diverge and (v) increase said air quality value if said first path and said second path diverge.

17. The apparatus according to claim 7, wherein said processor is further configured to (i) perform said computer vision operations on a sign located at said tunnel entrance to determine a length of a tunnel, (ii) determine a speed of said vehicle after said tunnel entrance, (iii) determine an amount of time that said vehicle is within said tunnel, (iv) determine an estimated time for said vehicle to be within said tunnel based on said length of said tunnel and said speed of said vehicle and (v) if said tunnel exit has not been detected after said estimated time, increase said air quality value.

18. An apparatus comprising:
an interface configured to receive pixel data corresponding to an exterior view from a vehicle; and
a processor configured to (i) process said pixel data arranged as video frames, (ii) perform computer vision operations on said video frames to (a) detect objects in said video frames and (b) determine characteristics of said objects, (iii) analyze said characteristics with respect to said vehicle to determine visual indicators to predict an air quality outside of said vehicle and (iv) generate a control signal in response to an air quality value, wherein
(a) said control signal is configured to toggle an activation of an air recirculation feature of said vehicle when said air quality value reaches a threshold value,
(b) said visual indicators are used to adjust said air quality value,
(c) said visual indicators comprise a plurality of types of factors extracted from said characteristics of said objects that provide evidence for determining said air quality value,
(d) said processor is configured to compile said plurality of types of factors and apply statistical weighting to said plurality of types of factors to determine said air quality value,
(e) said computer vision operations detect said objects by performing feature extraction based on weight values for each of a plurality of visual features that are associated with said objects extracted from said video frames,
(f) said weight values are determined in response to an analysis of training data by said processor prior to said feature extraction, and
(g) a data flow of said feature extraction comprises manipulating lists of regions of a vector that each share a common attribute and are grouped together based on said visual features.

19. An apparatus comprising:
an interface configured to receive pixel data corresponding to an exterior view from a vehicle; and
a processor configured to (i) process said pixel data arranged as video frames, (ii) perform computer vision operations on said video frames to (a) detect objects in said video frames and (b) determine characteristics of said objects, (iii) analyze said characteristics with respect to said vehicle to determine visual indicators to predict an air quality outside of said vehicle and (iv) generate a control signal in response to an air quality value, wherein
(a) said control signal is configured to toggle an activation of an air recirculation feature of said vehicle when said air quality value reaches a threshold value,
(b) said visual indicators are used to adjust said air quality value, (c) said visual indicators comprise a plurality of types of factors extracted from said characteristics of said objects that provide evidence for determining said air quality value,
(d) said processor is configured to compile said plurality of types of factors and apply statistical weighting to said plurality of types of factors to determine said air quality value, and
(e) said processor is further configured to (i) perform said computer vision operations on a sequence of said video frames to determine a first path of a polluting vehicle that corresponds to said visual indicators that decrease said air quality value, (ii) determine a second path of said vehicle, (iii) compare said first path to said second path, (iv) decrease said air quality value if said first path and said second path do not diverge and (v) increase said air quality value if said first path and said second path diverge.

* * * * *